US010708360B2

(12) United States Patent
Venkatesan et al.

(10) Patent No.: US 10,708,360 B2
(45) Date of Patent: Jul. 7, 2020

(54) METHOD FOR TRANSPORT AGNOSTIC COMMUNICATION BETWEEN INTERNET OF THINGS CLIENT AND BROKER

(71) Applicant: infiswift Inc., San Ramon, CA (US)

(72) Inventors: Sivakumar Venkatesan, Sunnyvale, CA (US); Saravanan Thulasingam, Austin, TX (US)

(73) Assignee: Infiswift Technologies, Inc., San Ramon, CA (US)

( * ) Notice: Subject to any disclaimer, the term of this patent is extended or adjusted under 35 U.S.C. 154(b) by 329 days.

(21) Appl. No.: 15/458,764

(22) Filed: Mar. 14, 2017

(65) Prior Publication Data

US 2018/0270310 A1    Sep. 20, 2018

(51) Int. Cl.
*H04L 29/08*    (2006.01)
*H04L 29/06*    (2006.01)
(Continued)

(52) U.S. Cl.
CPC .......... *H04L 67/12* (2013.01); *H04L 12/1836* (2013.01); *H04L 12/283* (2013.01);
(Continued)

(58) Field of Classification Search
CPC ............. H04L 12/1836; H04L 12/2803; H04L 12/2823; H04L 12/283; H04L 12/2836; H04L 12/4633; H04L 12/66; H04L 29/06068; H04L 29/06224; H04L 29/08135; H04L 29/08144–0827; H04L 29/08558; H04L 41/0246; H04L 41/0273; H04L 41/06; H04L 47/125; H04L 61/2592; H04L 61/6081; H04L 67/02; H04L 67/10;
(Continued)

(56) References Cited

U.S. PATENT DOCUMENTS 9,038,091 B2 * 5/2015 Jonnagadla ............. G06F 9/546
719/310
9,817,657 B2 * 11/2017 Hill ........................... G06F 8/70
(Continued)

OTHER PUBLICATIONS

D. Farinacci, et al. RFC 2784, Generic Routing Encapsulation (GRE), Mar. 2000.*
(Continued)

*Primary Examiner* — Brendan Y Higa
(74) *Attorney, Agent, or Firm* — Knobbe, Martens, Olson & Bear, LLP

(57) ABSTRACT

Methods are provided for communicating between devices in a network and remote servers, which may be located behind intermediate devices such as load balancers, by encapsulating messages sent by those devices and, in one implementation, to a load balancer in a transport header that may be understood by that load balancer; decapsulating the message from the transport header; re-encapuslating the message in a GRE tunnel and passing the message to a server, where the GRE tunnel is removed. Methods are also provided for communicating between devices in a network and local gateways by encapsulating messages sent by those devices and, in one implementation, to a load balancer in a transport header that may be understood by that gateway, and decapsulating the message from the transport header at the gateway.

20 Claims, 18 Drawing Sheets

(51) Int. Cl.
    *H04L 12/723*    (2013.01)
    *H04L 12/66*     (2006.01)
    *H04L 12/28*     (2006.01)
    *H04L 12/18*     (2006.01)
    *H04L 12/803*    (2013.01)
    *H04L 12/46*     (2006.01)

(52) U.S. Cl.
    CPC .......... *H04L 12/2836* (2013.01); *H04L 12/66* (2013.01); *H04L 29/06068* (2013.01); *H04L 29/06224* (2013.01); *H04L 29/08144* (2013.01); *H04L 29/08189* (2013.01); *H04L 45/50* (2013.01); *H04L 67/10* (2013.01); *H04L 67/1002* (2013.01); *H04L 67/1012* (2013.01); *H04L 67/1036* (2013.01); *H04L 67/2809* (2013.01); *H04L 67/42* (2013.01); *H04L 69/08* (2013.01); *H04L 69/22* (2013.01); *G05B 2219/33149* (2013.01); *H04L 12/4633* (2013.01); *H04L 47/125* (2013.01); *H04L 2212/00* (2013.01)

(58) Field of Classification Search
    CPC ... H04L 67/1002–1029; H04L 67/1036–1038; H04L 67/12; H04L 67/28–2814; H04L 69/08; H04L 2212/00; G05B 19/4185–4186; G05B 2219/33149; G06F 9/546; G06F 11/3065–3068
    See application file for complete search history.

(56) References Cited

U.S. PATENT DOCUMENTS

| | | | |
|---|---|---|---|
| 10,432,535 B2* | 10/2019 | Nandy | H04L 67/1002 |
| 2002/0174367 A1* | 11/2002 | Kimmel | G08B 13/19 726/4 |
| 2004/0019645 A1 | 1/2004 | Goodman | |
| 2005/0021622 A1 | 1/2005 | Cullen | |
| 2007/0245018 A1 | 10/2007 | Bhola | |
| 2010/0268764 A1* | 10/2010 | Wee | G06F 9/505 709/203 |
| 2010/0333111 A1* | 12/2010 | Kothamasu | H04L 51/14 719/313 |
| 2011/0320888 A1* | 12/2011 | Jonnagadla | G06F 9/505 714/49 |
| 2012/0215856 A1 | 8/2012 | Beardsmore | |
| 2013/0138814 A1* | 5/2013 | Kotecha | H04L 67/10 709/226 |
| 2013/0262931 A1* | 10/2013 | Siddalingesh | G06F 11/3672 714/28 |
| 2015/0024677 A1* | 1/2015 | Gopal | H04B 7/2041 455/13.1 |
| 2015/0237157 A1* | 8/2015 | Wang | G06F 16/278 714/4.11 |
| 2016/0051203 A1* | 2/2016 | Furness, III | A61B 5/026 600/503 |
| 2016/0350424 A1 | 12/2016 | Chen | |
| 2017/0134536 A1* | 5/2017 | Tessiore | H04L 69/18 |
| 2017/0237815 A1* | 8/2017 | Arsenault | H04W 4/70 709/217 |
| 2018/0011694 A1* | 1/2018 | Al-Fuqaha | G06F 8/34 |
| 2018/0091586 A1* | 3/2018 | Auradkar | H04L 67/1004 |
| 2018/0091588 A1* | 3/2018 | Qin | H04L 67/1012 |
| 2018/0183862 A1* | 6/2018 | Huh | H04L 12/185 |
| 2018/0248804 A1* | 8/2018 | Nandy | H04L 47/805 |
| 2018/0255152 A1* | 9/2018 | Jeuk | H04L 67/28 |

OTHER PUBLICATIONS

"3G", Newton's Telecom Dictionary, 21st ed., Mar. 2005.*
MQ Telemetry Transport (MQTT): V3.1 Protocol Specification, IBM: Developer Works, 2014.*
Severance, C. "Discovering JavaScript Object Notation" Computer, 45 (2012), pp. 6-8.*

* cited by examiner

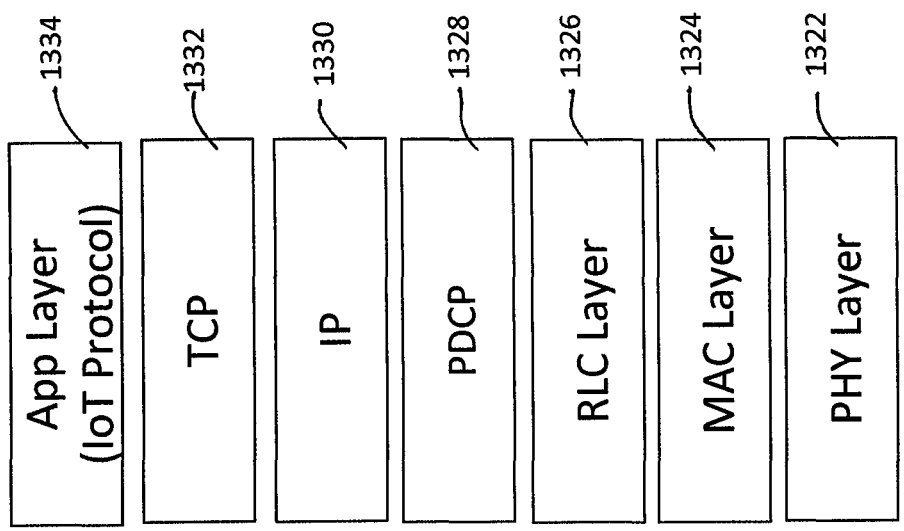
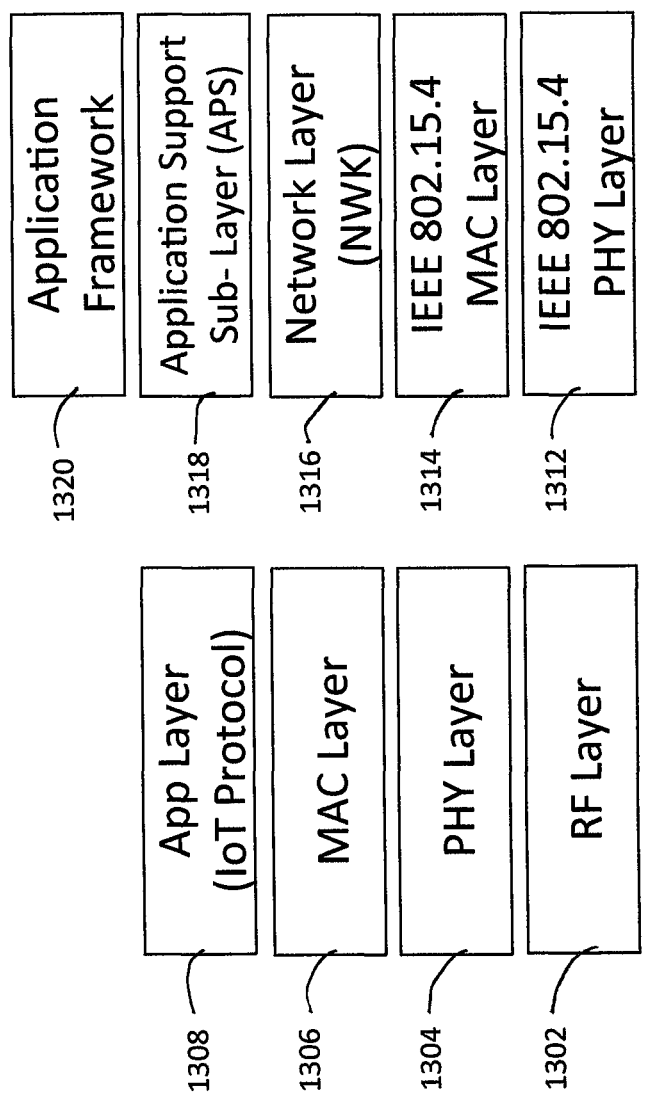
FIGURE 13C
FIGURE 13B
FIGURE 13A
FIGURE 13

METHOD FOR TRANSPORT AGNOSTIC COMMUNICATION BETWEEN INTERNET OF THINGS CLIENT AND BROKER

BACKGROUND

The present disclosure generally relates to the transmission of data over a network, and more particularly to the use of computing devices to communicate over a network.

The Internet of Things presents the opportunity to connect millions of devices that were once considered too simple or inexpensive to connect to the Internet, or that were believed to be sufficiently autonomous to require no centralized management. It has also created tremendous opportunities to collect data from those heretofore unconnected devices and use that data for a variety of purposes: improving efficiency, recognizing anomalies, improving product design and many others.

The Internet has largely evolved based on a client-server architecture: content is generally stored on and served from centralized computers designed for that purpose (often organized in highly sophisticated server farms) and presented on devices designed for viewing, listening or otherwise consuming that content. By specializing the functions of connected computers using such a hub-and-spoke model, the Internet has become enormously large and efficient: a system that only 20 years ago struggled to share small static images now permits millions of television watchers to stream high-definition movies every day.

The "original" Internet was architected to connect computers: devices with significant processing power, memory, user interfaces, etc., all of which require power. With the advent of the Internet of Things, millions or even billions of new devices will be connected to the Internet. Many of those devices will be headless (i.e., have very limited or non-existent user interfaces). Many of them will be low-cost items with minimal capabilities in terms of processing, storage, bandwidth, etc. Many will not be connected to a power source, and will be dependent on small batteries, solar cells, and even various forms of energy harvesting or ambient power, etc. Some of these devices will have to connect and communicate using extremely lightweight protocols in order to minimize power consumption. Such "thin" devices place a premium on efficient control and data exchange.

Another key aspect of the Internet of Things as currently implemented is a consequence of the nature of the protocols used to establish and maintain connections between devices. The Internet largely runs on a protocol called Transmission Control Protocol and Internet Protocol, or TCP/IP. TCP/IP dates back to DARPA and was first used in the 1970s as a way to design a network that provides only the functions of efficiently transmitting and routing traffic between nodes, leaving all other intelligence to be located in the networked devices themselves. Using a simple design, it became possible to easily connect almost any device or local network to the larger ARPANET, irrespective of the local characteristics of those devices.

The requirements of the Internet of Things have lead to the creation of new protocols (most of which work within the TCP/IP framework) that address the difficulties created when managing large numbers of thin devices.

One such protocol is MQTT. MQTT (formerly known as MQ Telemetry Transport) is an ISO standard (ISO/IEC PRF 20922) publish-subscribe-based "lightweight" messaging protocol for use on top of the widely used TCP/IP protocol. It is designed for connections with remote locations where a small code footprint is preferred or network bandwidth is limited. The publish-subscribe messaging pattern generally includes a message broker. The broker is responsible for distributing messages to interested clients based on the topic of a message. The MQTT protocol is used to implement a publish-subscribe system. Clients connect to a broker via a TCP/IP connection, and MQTT control packets are sent over that connection. The SUBSCRIBE packet is used by a client to inform the broker that it wishes to receive messages published for a certain topic. The PUBLISH packet is used by the clients to inform the broker of new messages for a given topic. The broker's role is to keep track of the subscribers and inform them of new messages whenever any new message is received from any client for the topic those subscribers have expressed interest for. Since each connection would consume a certain amount of CPU usage, memory, and network resources on the broker computer, each broker can only maintain a finite number of connections. In order to support more clients than those upper bounds, more broker instances can be deployed. This would also generally mean that such broker instances are hosted behind a standard load balancer, as is well understood in the art, so that clients still connect to one broker IP address, but internally those connections are served by different broker instances. When a cluster of brokers are connected through a load balancer, a subscriber for a topic may connect to Broker 1 while the publisher of the topic may connect to Broker 2.

The publish-subscribe architecture of MQTT has numerous advantages for efficient operation of edge devices, but it also creates a challenge not present in traditional HTTP-based server-to-server communication, such as when multiple clients connect to a web server. Because HTTP is a request/response protocol, when request #1 is received by a server, that server typically updates a common backend database. A subsequent request #2 received by a different server fetches the updated value with little or no latency between the recording of the updated value by the first server and the time when other servers can retrieve that value. In that case, there is no direct communication needed between the two servers.

If this approach is applied to a Publish/Subscribe Protocol, when a publisher connected to Broker 1 publishes a message, Broker 1 would in turn record the published message in a database. Broker 2 periodically polls that database for new messages and then forwards them to its subscribers. But this approach generally increases the latency of the system. For example, if Broker 2 polls the database once every 100 milliseconds, the latency for a new message that just missed being included in the previous polling action by a given broker would be at least 100 milliseconds. Because polling is in a sense a wasteful process (in that it diverts resources away from communication with external publishers and subscribers), a trade-off is created: more frequent polling reduces latency, but effectively reduces the number of edge devices a given broker can manage; less frequent polling increases latency.

Another approach would be for Broker 1 to post the messages it receives to some form of a message queuing service, which would then dispatch those messages to Broker 2. This introduces an extra hop in between Broker 1 and Broker 2 and would thus also increase latency. This approach introduces extra complexity because it requires a new message queuing service in addition to the brokers themselves.

Another approach would be to create a direct bridge connection between the brokers so that all messages can be exchanged bi-directionally between brokers. Such basic bridging of MQTT brokers is well-known in the prior art. However, such basic bridging, which typically utilizes a single TCP connection as a bridge would suffer from one or more of the following limitations:

There would be significant difficulty in adding a new broker to collection of brokers behind a given load balancer without causing a loss of messages sent prior to bridge establishment.

A bridge of fixed bandwidth is likely to experience congestion during heavy traffic between the brokers, or be wasted during low-traffic periods if it is scaled for the worst-case scenario.

Special local/remote prefixes would be required to avoid fan-out loops in bridging. A fan-out loop occurs when (a) Broker 1 forwards a message to Broker 2, (b) Broker 2 forwards that same message back to Broker 1, and so on. This damaging problem is typically avoided in prior art by using special prefixes for the topics being forwarded so that Broker 2 knows which messages to forward to Broker 1 and which ones not to be forwarded. However, using such prefixes both reduces efficiency (by adding computational steps and increasing the size of each message) and increases code complexity, creating additional opportunities for bugs and errors.

Asymmetric functionality between Broker 1 and Broker 2 depending upon who initiates the bridge connection. This makes the implementation of such algorithms prone to deadlocks or creation of extra, unused bridges. In an asymmetric architecture, where there is only one bridge connection between two brokers, it may not be clear which broker should create it. Will Broker 1 be the initiator of the connection and Broker 2 the recipient of the connection or vice-versa? How do the brokers know who will do what? What if two brokers attempt to initiate a bridge connection to each other around the same time? The result may be multiple connections, or one, or perhaps even none. If an extra, unused bridge is created, is it dropped? If so, how do the brokers know which one to drop? If both brokers seek to drop an unused connection, they might end up dropping all of them.

Thus, there currently exists no satisfactory method of connecting multiple brokers in a subscribe-publish architecture. It would be advantageous to provide an efficient and scalable mechanism for the communication between the brokers in order to reliably serve the published messages to the proper subscribers while introducing the least possible latency.

The present disclosure introduces advanced bridging techniques that overcome the above-mentioned limitations in an elegant way to provide a simple implementation.

A common method for connecting clients to the Internet and thus to the brokers is to employ a local gateway. It may be impossible or infeasible for low-power, simple edge devices to directly communicate with remote brokers. A common topology is for such devices to communicate with local gateways, which in turn communicate with the remote, cloud-based brokers. If the clients communicate wirelessly with the gateway, the gateway can be located wherever power (and sometimes a wide area network connection such as an Ethernet connection) are available. Various low-power wireless networking technology permit the clients to effectively send data to and receive data from such gateways.

There are a number of existing methods for managing traffic on the broker side. The simplest method for connecting clients to a broker is to connect each client (or each local gateway) directly to the IP address of a specific broker without intermediary links such as load balancers. This approach has the advantages of simplicity and, if the number of devices is small, low cost. However, it has significant drawbacks when the number of clients becomes large. If the number of clients is large enough to require a cluster of multiple brokers, the tying of clients to specific physical brokers means there is no way to adjust for varying loads: on broker may be overwhelmed while another sits idle. It also provides no failover mode if one of the brokers goes offline, unless each broker has its own dedicated backup, which is very inefficient.

A more complex existing approach to managing traffic on the broker side when brokers are clustered is to apply a load balancing protocol such as HAProxy. HAProxy is open source software that provides a load balancer and proxy server for TCP and HTTP-based applications that spreads requests across multiple servers. While conventional load balancing proxies such as HAProxy are effective in balancing loads across multiple brokers, and may be aware of the content of some types of messages, such as HTTP, they do not have the ability to interpret the content other protocols, such as MQTT. Thus they are not capable of intelligently routing messages using protocols like MQTT.

Another architecture for leveraging the MQTT broker-client process involves the use of load balancers using "Elastic Beam" proxy routers between the brokers and the Internet. With this system, the TCP socket, which defines the pathway that connects the client with the cloud service, is terminated in the broker rather than at an intermediate step such as the load balancer. This architecture therefore makes all of the elements in the chain transport-aware. While this approach has some advantages for a system designed only to work with a specific transport layer, it also means that such a network is not usable with devices employing any other transport layer, which limits flexibility and thus its value in complex systems.

An additional disadvantage of this topology is that it may be difficult or impossible to optimize traffic prioritization based on different requirements for quality of service (QoS)—that is, if a service offers clients varying QoS levels based on response time or other standards, this approach does not permit prioritization at the load balancer of traffic associated with high-QoS accounts. In effect, it requires that the system be capable of delivering performance sufficient to deliver maximum QoS levels to all traffic, because there is no way to differentiate between permitted QoS levels until the messages from the clients have reached the appropriate brokers.

Another disadvantage of this topology is that this form of load balancer assumes that the brokers behind the load balancer are in a demilitarized zone (DMZ) and therefore it does not employ secure tunneling mechanisms. Where brokers are geographically separated, this may mean that unencrypted traffic passes between those locations, which increases the risk of eavesdropping, hacking, etc. And an architecture that assumes that brokers live within a DMZ is likely to be set up to accommodate only a single IoT protocol, and thus be unable to serve other protocols.

Also, the Elastic Beam load balancer is a TCP proxy and hence it does not terminate TCP sessions.

As is often the case with new and rapidly evolving technology, a multitude of vendors have created huge numbers of devices communicating in disparate, often incompatible ways. Some vendors provide devices that employ architectures in which the content of messages is not separable from the protocol used to send them. Thus it becomes difficult to combine components and data from different vendors. The multitude of clients with various physical networking media and protocol stacks potentially create a Babel of incompatible systems and messages.

Thus there exists a need for a common, content-aware method of processing such messages on both the gateway devices and the brokers in the cloud in order to permit multiple IoT and other protocols to safely be employed within a single cloud architecture. The method described here achieves this by designing an IoT messaging protocol stack that is independent of the transport mechanism.

SUMMARY

According to one embodiment of the present disclosure, a computer-implemented method for bridging Publish/Subscribe brokers in a cluster is provided. The method includes listening to an internal bridge port on one broker for receiving bridge connections from other brokers in the cluster, and in parallel, connecting to the internal bridge ports of each of the other brokers in the cluster, waiting for all such incoming and outgoing bridge connections to be completed, and then opening up the external port for serving the actual clients. The method also includes monitoring the health of the bridge connection and, upon detection of connection failure, storing messages in a persistent store and replaying them on the bridge connection once it is restored. The method also includes creating separate bridges for each direction of traffic in order to make the broker code completely symmetric and also supporting the creation of an arbitrary number of bridge connections between each pair of brokers for each direction to reduce latency. Because the broker code is symmetrical, the same code may be deployed on one broker or 100 brokers, without requiring changes or adaptation, whereas traditional client-server architectures are not symmetrical, and where a single computer includes both client and server functionality, finding, understanding and debugging problems is more complex.

According to another embodiment of the present disclosure, a system for bridging Publish/Subscribe brokers in a cluster is provided. The system includes a memory that includes instructions, and a processor. The processor is configured to execute the instructions to implement the above-mentioned method.

According to a further embodiment of the present disclosure, a machine-readable storage medium includes machine-readable instructions for causing a processor to execute the instructions to implement the above-mentioned method.

According to a further embodiment of the present disclosure, the invention relates to a network architecture and design framework that facilitate a method comprising making the IoT message processing on a gateway or broker agnostic to the transport mechanism used to get the message to the gateway or broker.

According to a further embodiment of the present disclosure, the invention relates to methods of terminating secure session layer and transport layer packet headers in a network load balancer in a cloud message processing platform scenario such that IoT protocol messages can be transported devoid of those packet headers.

According to a further embodiment of the present disclosure, the invention relates to methods of encapsulating bare IoT protocol messages with network layer tunnel headers so that intermediate nodes in a cloud message processing platform are not required to inspect or interpret the bare IoT protocol messages but instead simply forward them to the cloud broker destination based on the tunnel header information alone.

According to a further embodiment of the present disclosure, the invention relates to methods of de-capsulation of network layer tunnel headers at a cloud broker so that it can simply process the IoT message which contains the sensor data being sent by the IoT client.

According to a further embodiment of the present disclosure, the invention relates to methods of de-capsulation of other transport layer headers, medium-access-control layer headers and physical layer headers attached to packets sent by clients to a directly connected gateway device, so that the bare IoT message underneath those headers could be processed in an identical way as they are processed by the cloud broker.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

FIG. 13, which includes FIGS. 13A, 13B, and 13C, illustrates examples of protocol stacks that may be used by and with the subject invention.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. For example, the invention is described in the context of the MQTT protocol as a specific example of a Publish/Subscribe system, but this disclosure is in no way limited to MQTT protocol. In other instances, well-known structures and techniques have not been shown in detail so as not to obscure the disclosure.

Figure 1:
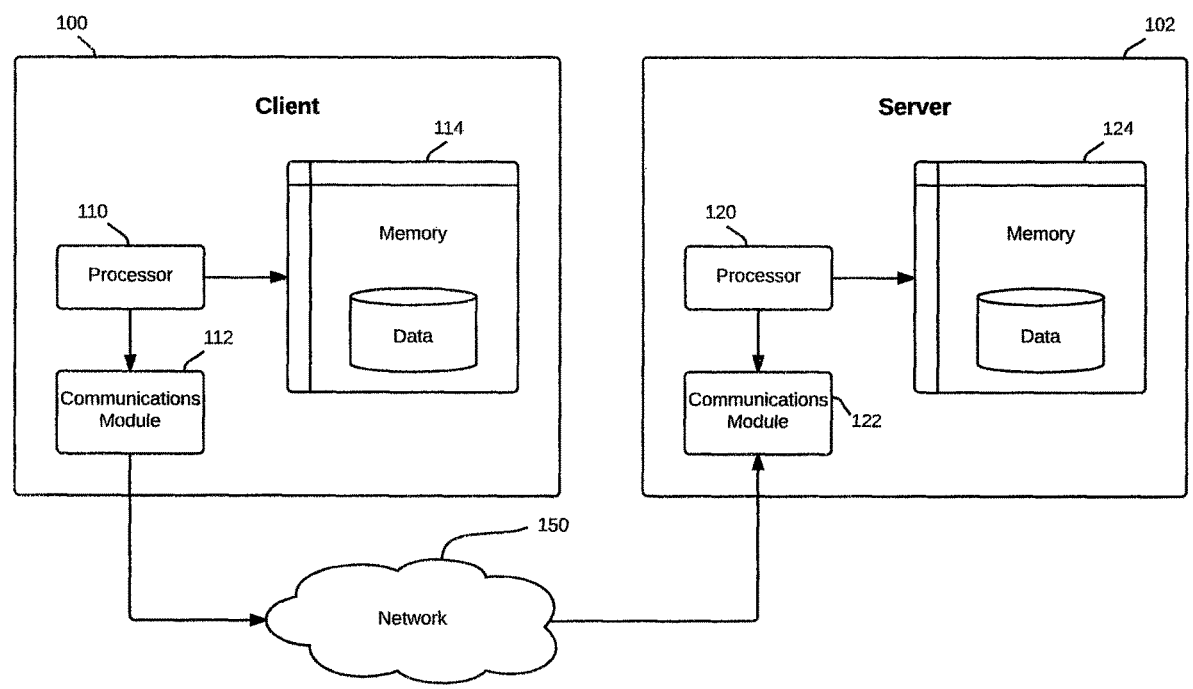
FIG. 1 is a block diagram illustrating an example computer system with which the client and server of FIG. 2 can be implemented.

FIG. 1 is a block diagram illustrating computer systems connected as client and server as discussed in more detail below. Client computer 100 may be a conventional computer, or may be a handheld and/or wired or a wireless device such as a tablet, smart phone, networked industrial sensor, home automation node, cellular telephone or any other device capable of accessing the network. Client computer 100 may utilize a browser configured to interact with the World Wide Web. Such browsers include but are not limited to Google Chrome, Mozilla Firefox, Opera or Apple Safari. They may also include browsers used on handheld and wireless devices. Client computer is comprised of components including a processor 110, which may comprise a processor such as those sold by Intel and AMD. Other processors may also be used, including general-purpose processors, multi-chip processors, embedded processors and the like. Client computer 100 also comprises communications module 112, which may comprise one or more network interface cards or other means of connecting computer 100 to a network. Client computer 100 also comprises memory 114, which may comprise random access memory (RAM), electronically erasable programmable read only memory (EEPROM), read only memory (ROM), hard disk, floppy disk, CD-ROM, optical memory, or other method of storing data. Similarly, server 102 is comprised of components including a processor 120, which may comprise a processor such as those sold by Intel and AMD. Other processors may also be used, including general-purpose processors, multi-chip processors, embedded processors and the like. Server 102 also comprises communications module 122, which may comprise one or more network interface cards or other means of connecting computer 100 to a network. Server 102 also comprises memory 124, which may comprise random access memory (RAM), electronically erasable programmable read only memory (EEPROM), read only memory (ROM), hard disk, floppy disk, CD-ROM, optical memory, or other method of storing data. It should be noted that "client" and "server" are defined based on the roles played in a given context. In practice a client may play the role of a server, and a server may sometimes play the role of a client. In the context of multiple connected brokers, each broker plays the role of both client and server according to the direction of the bridge. Client 100 and server 102 are connected via a network 150. Presently preferred network 150 comprises a collection of interconnected public and/or private networks that are linked to together by a set of standard protocols to form a distributed network. While network 150 is intended to refer to what is now commonly referred to as the Internet, it is also intended to encompass variations which may be made in the future, including changes additions to existing standard protocols.

Figure 2:
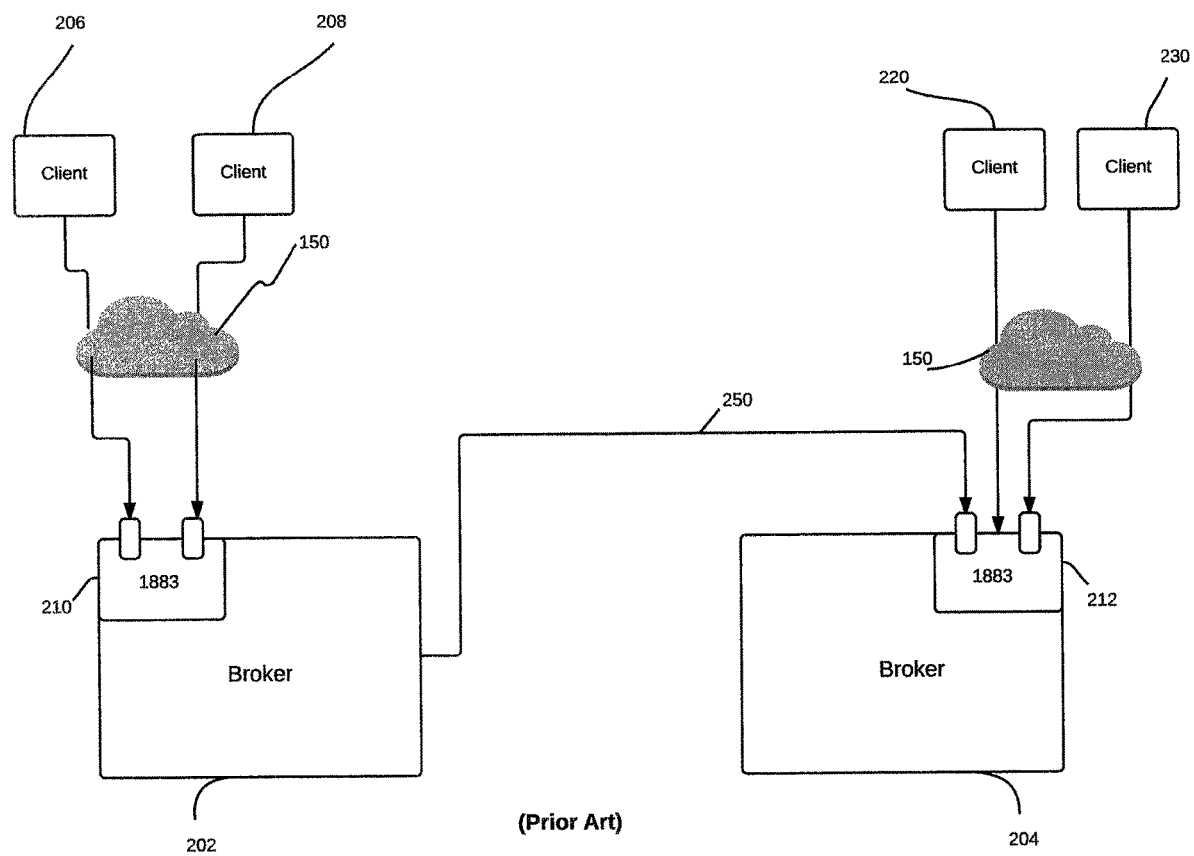
FIG. 2 shows a single bridge implementation as found in the prior art.

FIG. 2 shows a single-bridge implementation of a publish-subscribe environment as found in prior art. The example shown includes two brokers, 202 and 204. Broker 202 connects to clients 206 and 208 over network 150. That connection to broker 202 may be made by connecting to a public port on broker 202 such as port 1883 (shown as 210 in FIG. 2), but other ports may also be used for this connection. Similarly, broker 204 connects to clients 220 and 230 over network 150 by connecting to a public port 212 on broker 204, but private ports could be used for this function as well.

Without appropriate means for sharing information between broker 202 and broker 204, the publish-subscribe architecture will not permit, for example, client 220 to subscribe to messages published by client 206, because they are connected to two different brokers. In order to enable such communication, a connection between the two (or more, in more complex environments) brokers is used. Thus in the prior art, broker 202 is connected to broker 204 via TCP connection 250. Some of the disadvantages of connecting brokers in this fashion were previously discussed.

Figure 3:
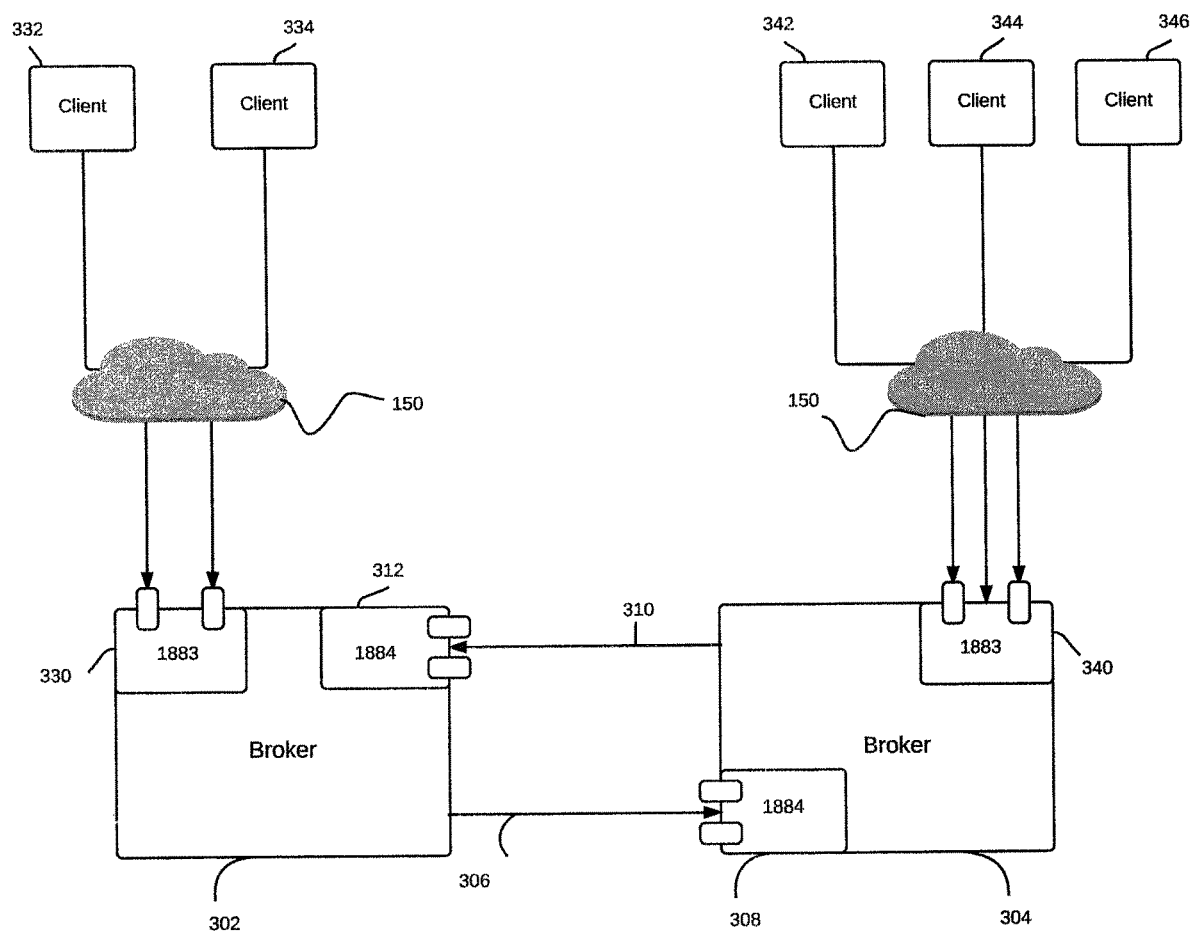
FIG. 3 illustrates an example of the subject invention with two brokers, each with one bridge to receive messages published on the other broker.

In contrast, the subject invention provides an effective means for connecting multiple brokers that substantially eliminates latency and maximizes efficient utilization of server resources. FIG. 3 illustrates an example in which two brokers employ one bridge each in order to receive messages published on the other broker according to the teachings of the subject invention. Broker 302 initiates an outbound connection 306 to broker 304 which has opened its internal bridge port 308 (generally using port 1884). Similarly, broker 304 initiates an outbound connection 310 to broker 302 which has opened its own internal bridge 312. Once these two connections are established, broker 302 opens up public port 330 (generally using port 1883) for clients that publish/subscribe to that broker. Clients 332 and 334 connect via network 150 to public port 330. Broker 304 opens its own public port 340 in order to connect via network 150 to clients 342, 344 and 346.

Bridge connections 306 and 310 permit efficient communication between subscribers and publishers connected to different brokers. For example, if client 332 publishes a message to which client 344 is subscribed, the architecture described in FIG. 2 would not permit client 334 to receive the message. But with the subject invention, when client 332 publishes a message, it is received via network 150 on public port 330 on broker 302. Broker 302 in turn transmits that message to broker 304 via bridge connection 306, and broker 304 in turn transmits the message to client 344 via its own public port 340.

Figure 4:
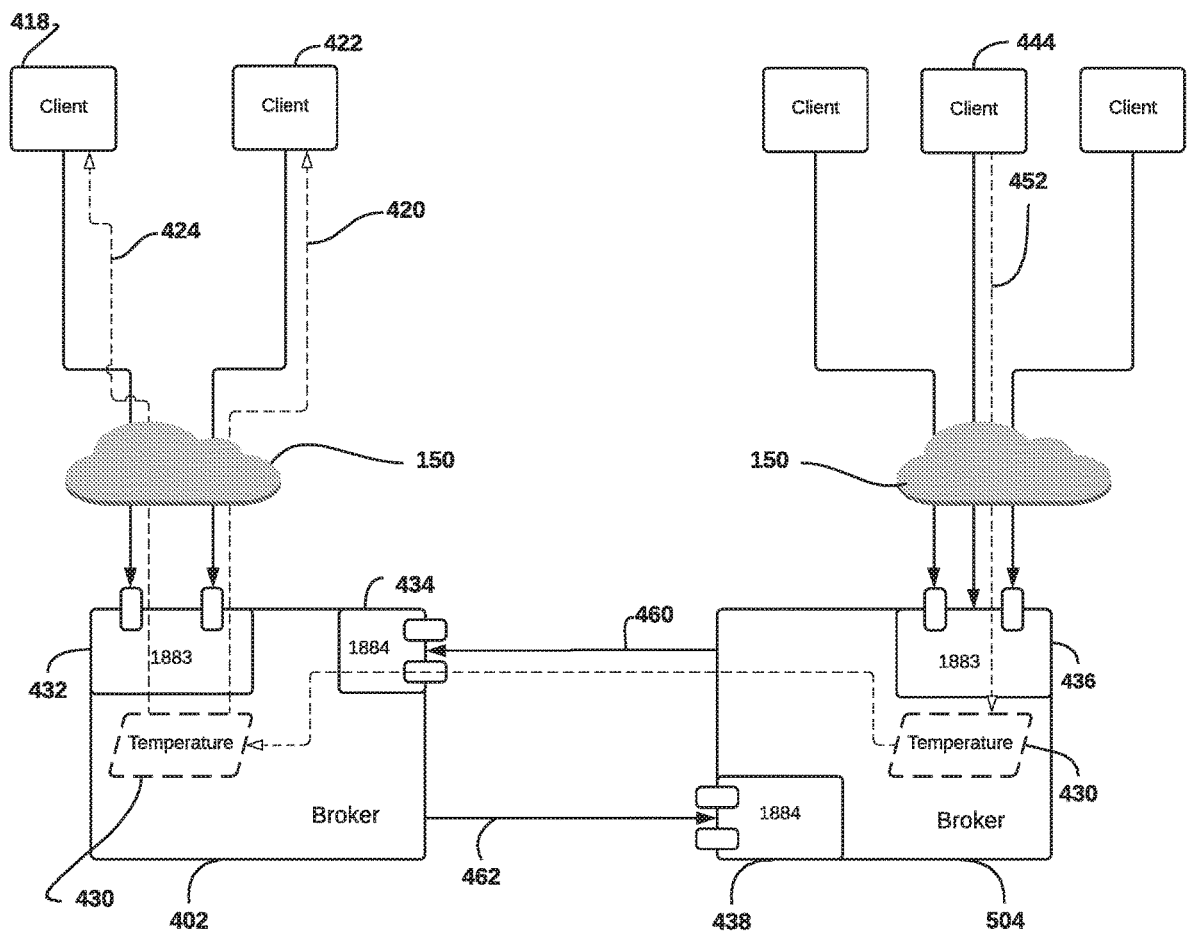
FIG. 4 builds up on the system shown in FIG. 3 to illustrate an example topic published by a client on Broker 1 which is subscribed to by a client connected to Broker 2, and hence will need the bridge from Broker 2 to Broker 1.

FIG. 4 represents a specific example of how the bridge architecture of the instant invention permits a topic published by a first client on Broker 1 to be shared with a second client that is connected to Broker 2 and is subscribed to messages from client 1.

Here, client 422 subscribes 420 to a topic 430 called Temperature XYZ123 after connecting to public port 432 on Broker 402 via network 150. Topic 430 may, for example, consist of regular reports 424 of readings generated by a thermistor contained within a specific wall-mounted sensor or a networked thermostat at a specific location, shown as client 418. Similarly, Client 444 also subscribes 452 to topic 430 on broker 404 after connecting to Broker 404, also via network 150 and public port 432.

When Client 418 publishes message 424 containing information about topic Temperature 430 to Broker 402, Broker 402 sends this message 424 to both Client 422 via network 150 and to broker 404 via private port 434 and the connection 460 previously opened by broker 404. Broker 404 would then forward this message to subscribed client 444 via public port 436 and network 150. Messages may automatically be sent by Broker 402 to all other brokers that maintain bridge connections with Broker 402, or other methods of optimizing traffic between brokers may be utilized. In the event (not shown in FIG. 4) that a client connected to broker 402 was subscribed to a topic being published by a client connected to broker 404, those messages would be sent by broker 404 using private port 438 and connection 462. This instance is illustrated in FIG. 5.

Figure 5:
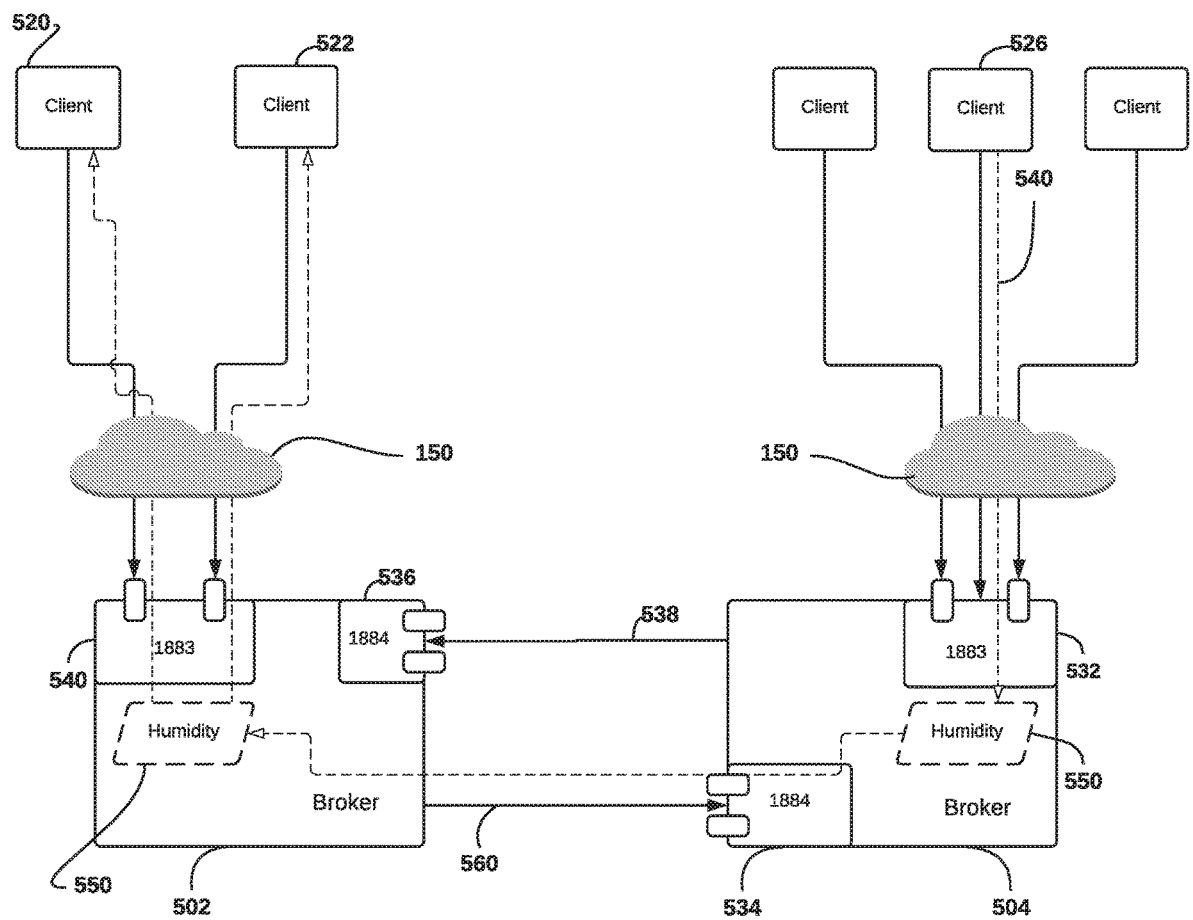
FIG. 5 illustrates an example topic published by a client on Broker 2 which is subscribed to by a client connected to Broker 1, and hence will need the bridge from Broker 1 to Broker 2.

FIG. 5 illustrates an example topic published by a client on second broker 504 which is subscribed to by a client connected to first broker 502 via network 150 and public port 540 and hence will need the bridge 560 from second broker 504 to first broker 502. This communication uses a bridge running in the opposite direction relative to the bridge illustrate in FIG. 4. Here, client 520 and client 522 subscribe to a topic called Humidity 530 via network 150 to broker 502. Client 526 publishes a message 540 for the topic Humidity 550 via network 150 and public port 532 to broker 504. Broker 504 fans out this message to broker 502 via private port 534 and incoming bridge 560 from broker 502. Broker 502 then forwards it to subscribed clients 520 and 522. In the event (not shown in FIG. 5) that a client connected to broker 504 was subscribed to a topic being published by a client connected to broker 502, those messages would be sent by broker 502 using private port 536 and connection 538.

Figure 6:
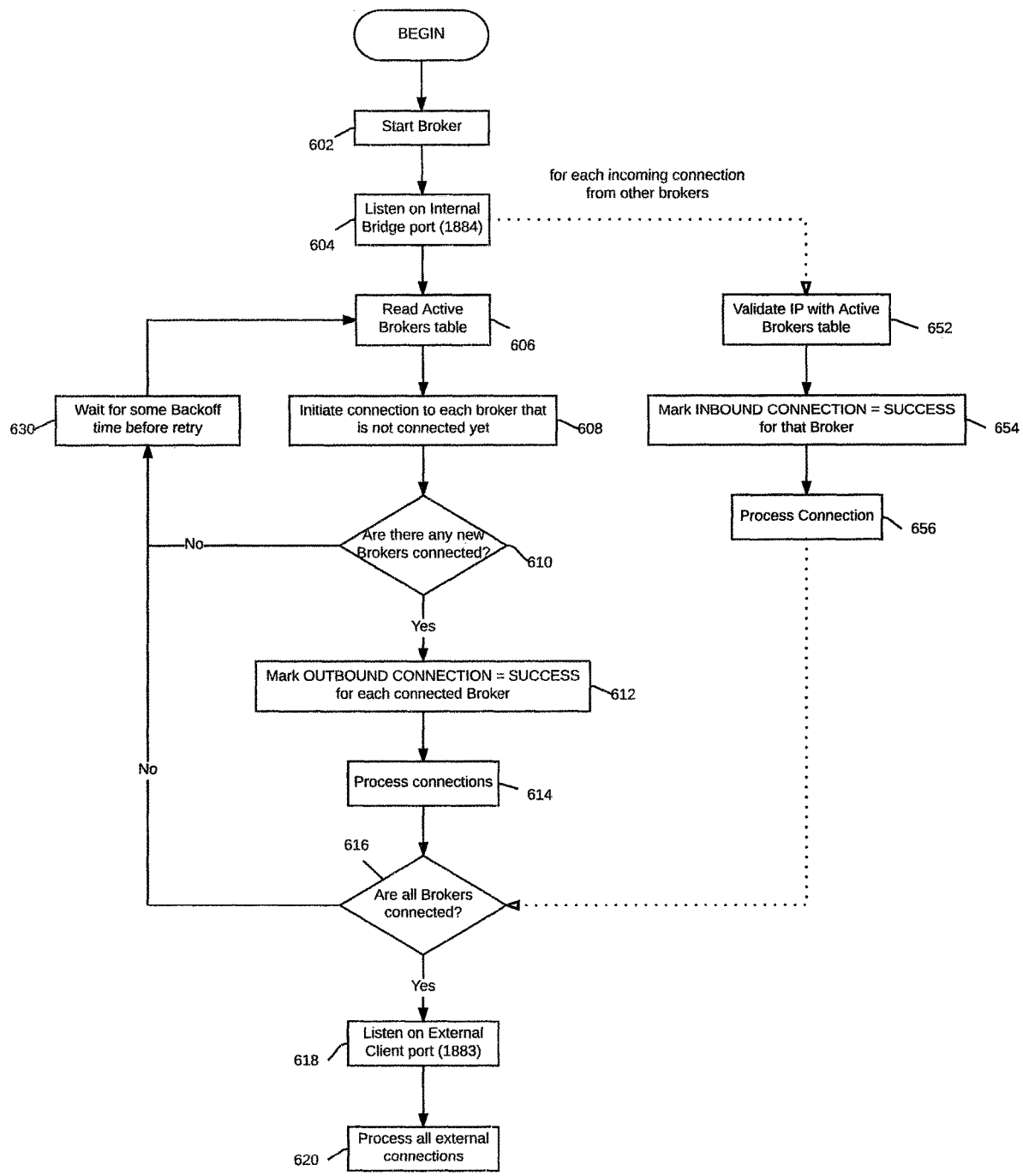
FIG. 6 depicts the flowchart for the initial bridge establishment algorithm on each broker.

FIG. 6 is a flowchart for the initial bridge establishment algorithm on each broker. Upon starting 602, a broker that is initiating the process of establishing bridge connections to other brokers listens on its internal bridge port (such as port 1884) 604. It then performs two asynchronous operations.

In one process, for each incoming connection request from other requesting brokers, the broker stepping through the connection process validates the source IP address of the requesting broker to make sure it is listed in the Active Brokers Table 652. This step is important as a security precaution: if a computer executing malicious code connects to a broker, it may gain access to all of the messages that pass through that broker. If the IP address of the requesting broker is valid, the bridge-making broker marks the inbound connection from that requesting broker as SUCCESS 654. It then proceeds to process the connection 656 by doing the necessary read/write operations.

In the second operation, the bridge-making broker reads the active brokers table 606 to find the IP addresses of the other brokers to which it should connect, and asynchronously initiates the outbound connection to each broker on that list that is not yet connected 608. It then waits for one or more of those connections to be completed. The bridge-making broker then checks if any of those brokers has connected 610, and if so, it then marks that the outbound connection for that broker as a SUCCESS 612 and proceeds to process that connection by performing the necessary read/write operations 614. The bridge-making broker then checks if all the inbound and outbound connections for all brokers are marked as SUCCESS 616.

If so, it then proceeds to open the external port (such as 1883) to which the publishers and subscribers can subsequently connect. It then processes each external connection by forwarding the published messages to the subscribers both locally and via the remote bridges 620.

Figure 7:
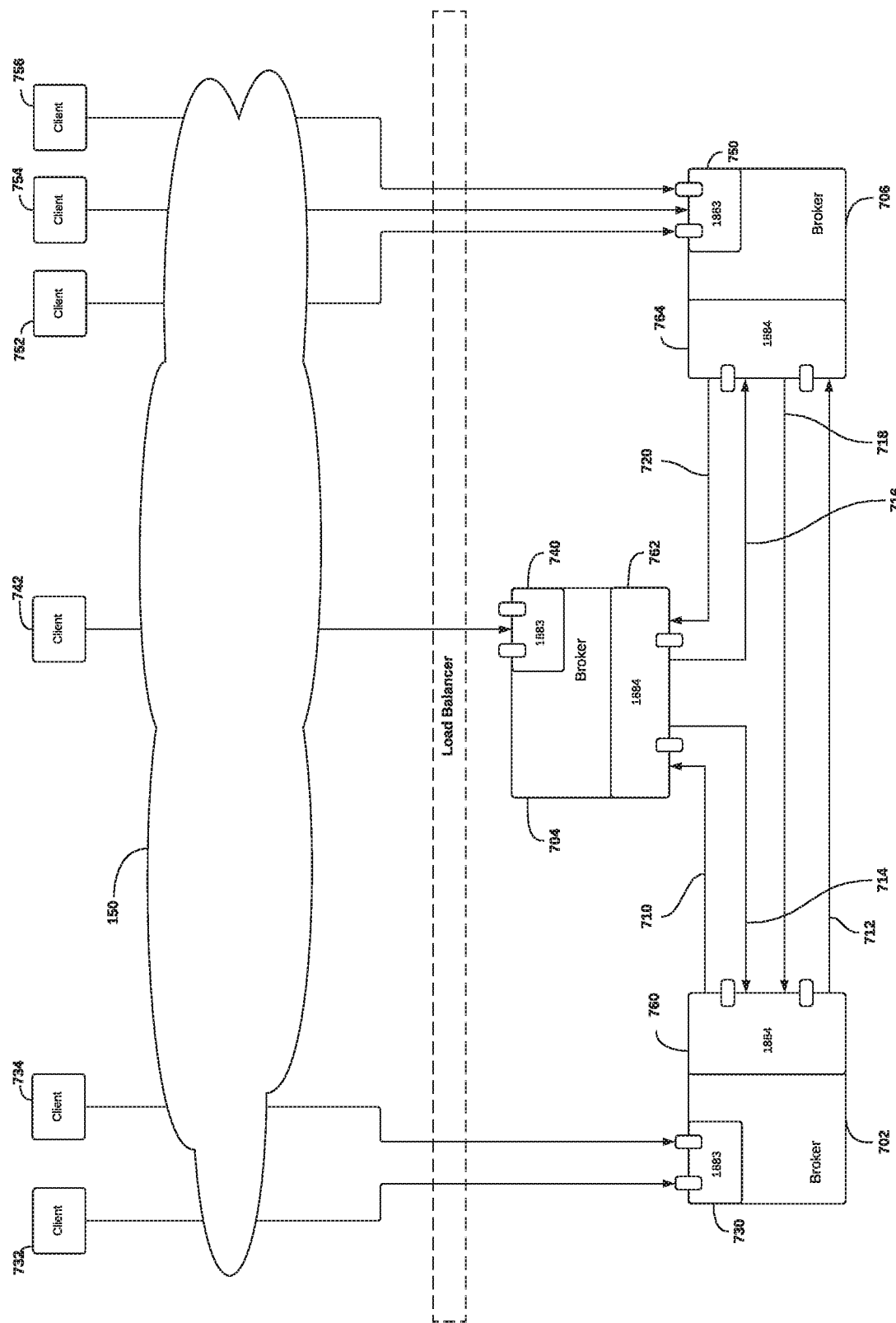
FIG. 7 illustrates an example with three brokers, each with one outbound bridge to receive messages published by clients on each of the other brokers and one inbound bridge to send messages published by clients connected to it, to the each of the other brokers.

If not all inbound and outbound connections have been marked as successful, the bridge-making broker then waits for some back-off time 630 and retries the outbound connection operations FIG. 7 illustrates an example with three brokers 702, 704 and 706, each with one outbound bridge to receive messages published by clients on each of the other brokers and one inbound bridge to send messages published by clients connected to it, to the each of the other brokers. Thus using private port 760, broker 702 established outbound bridge 710 with broker 704 and outbound bridge 712 with broker 706; broker 704 uses private port 762 to establish outbound bridge 714 with broker 702 and outbound bridge 716 with broker 706; broker 706 uses private port 764 to establish outbound bridge 718 with broker 702 and outbound bridge 720 with broker 704.

As in previous figures, once these bridge connections have been created, broker 702 opens up public port 730 (generally using port 1883) for clients that publish/subscribe to that broker. Clients 732 and 734 connect via network 150 to public port 730. Broker 704 opens its own public port 740 in order to connect via network 150 to client 742, and broker 706 opens public port 750, which permits clients 752, 754 and 756 to connect.

Figure 8:
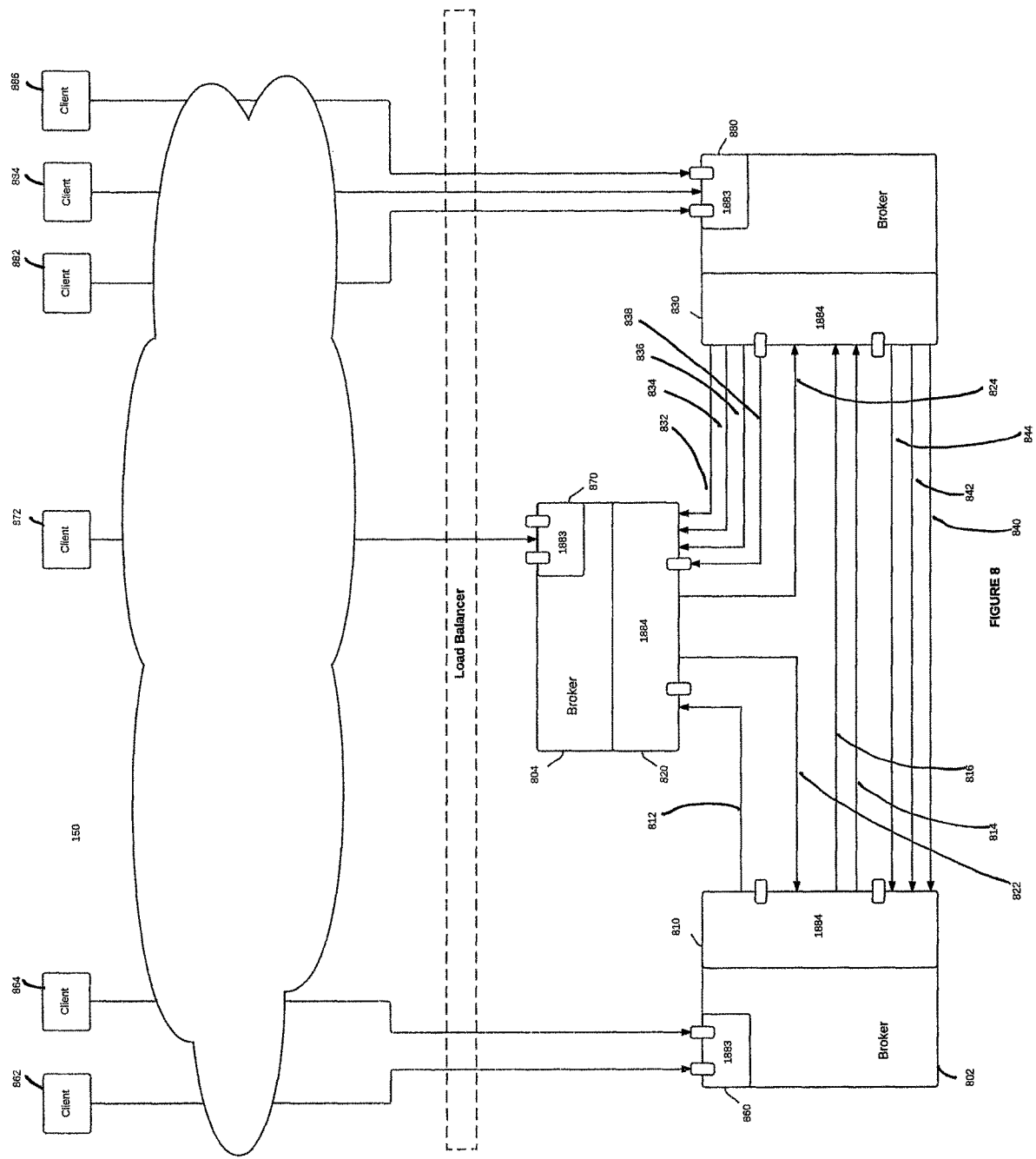
FIG. 8 illustrates an example with an arbitrary number of bridge connections per direction between a pair of brokers to improve scalability and reduce latency.

In some applications, particularly those with a large number of subscribers on one broker that are subscribed to publishers connected to a different broker, a single bridge per direction between brokers may be insufficient to support efficient scaling. FIG. 8 illustrates an embodiment of the subject invention in which multiple bridge connections per direction are used between a pair of brokers to improve scalability and reduce latency. Using private port 810, Broker 802 has one outbound bridge 812 with Broker 804 and two outbound bridges 814 and 816 with Broker 806. Broker 804 has one outbound bridge 820 to Broker 802 and one outbound bridge 822 to Broker 804. Broker 806 has four outbound bridges 830, 832, 834 and 836 to Broker 804 and three outbound bridges 840, 842 and 844 to Broker 802. As in previous figures, once these bridge connections have been created, broker 802 opens up public port 860 (generally using port 1883) for clients that publish/subscribe to that broker. Clients 862 and 864 connect via network 150 to public port 860. Broker 804 opens its own public port 870 in order to connect via network 150 to client 872, and broker 706 opens public port 880, which permits clients 882, 884 and 886 to connect.

FIG. 8 shows a single instance of the multi-bridge concept; those skilled in the art will recognize that numerous variations are possible. In general, it may be expected that when a publisher on a first broker has a large number of subscribers on a second broker, it may be advisable to create additional bridges from said first broker to said second broker.

Figure 9:
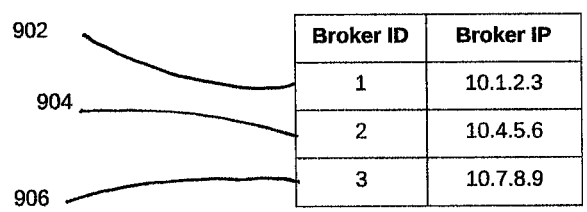
FIG. 9 shows sample entries in the Active Brokers Table for a cluster that has three brokers.

FIG. 9 shows sample entries in the Active Brokers Table (900) for a cluster that has three brokers. The Broker IPs are shown as private IP addresses in order to lock down the bridge ports to be accessible only to the other brokers which are in the same private network space and not to the clients (publishers/subscribers). Thus broker 902 has internal ID#1 and is located on the internal network at IP address 10.1.2.3; broker 904 has internal ID#2 and is located on the internal network at IP address 10.4.5.6; and broker 906 has internal ID#3 and is located on the internal network at IP address 10.7.8.9. In a large installation, the table will of course be much longer.

The invention described in the present disclosure allows each broker in the Publish/Subscribe cluster to be initialized independent of each other with no particular ordering requirements. To achieve this, each broker is provided a table of Active Brokers (as illustrated in FIG. 9) as the initialization data. This is the table that informs each broker of the information corresponding to the other brokers in the cluster, which are generally expected to also start up around the same time. The table can be provided to a broker via command-line arguments or via a configuration file/database at a specified location. Each broker is also provided its own ID as part of the initialization so it knows which are the other brokers it needs to connect to upon starting up. Similar mechanisms are used to pass on other configuration values such as the external port (e.g. port 1883) and the internal bridge port (e.g. port 1884) at start-up time.

When a client that is connected to a broker publishes a message for a given topic, it is the responsibility of the receiving broker to send that message to all the subscribers for that topic. For those subscribers that happen to be connected directly to that broker, the broker can send that message directly using the direct connection. However, since it is possible that there are other subscribers that are possibly connected to one or more other brokers in the cluster, it is the responsibility of the broker that receives a published message to forward it to each of the other brokers. Those brokers, in turn, would forward those messages to the subscribers that are directly connected to them.

It is possible to optimize the fan-out of such messages to only a subset of the brokers instead of sending to all the brokers, but such optimization techniques are beyond the scope of the present disclosure. So for the purposes of this disclosure "fan-out" refers to sending a received message to each of the others brokers with which the receiving broker has a bridge connection.

The present disclosure introduces a method according to which a broker always sends outgoing messages only on the bridge connections initiated by each of the remote brokers and similarly receives incoming messages only on the bridge connections that it initiated to each of the remote brokers. This design results in at least the following advantages:

It allows each broker to treat the bridge connections with other brokers for the most part as if they were regular client connections. For example, with MQTT protocol, SUBSCRIBE control packets are intended to be sent only by a client to a broker (and not the other way) and thus the subscriptions for the topic '#' (which will be done by a client to receive all traffic from the remote broker via the bridge) would fit naturally within this convention when the broker responds to that subscription by sending all messages to all topics via that bridge connection, just as it would send to any other client connection.

It enables each broker to determine when to create additional bridge connections to a remote broker based on the traffic metrics it observes based on the volume and latency of the messages it receives and its own ability to handle traffic increases subject to its own resource constraints.

It avoids deadlocks as well as duplicate connections in establishing bridge connections which could happen if there were only a single connection intended for both directions and both brokers try to establish that connection.

It keeps the bridging mechanism (including broker code) symmetric without requiring any further coordination between the brokers to realize all the above-mentioned advantages.

One of the potential pitfalls in the above-mentioned operation is the possibility of fan-out loops. For example, if Broker 1 received a message from its client C1 and forwards it to Broker 2 and Broker 3, then Broker 2 should not forward the same message to Broker 1 or Broker 3. Such fan-out loops can significantly degrade the performance of a system by clogging traffic with redundant messages. To prevent such loops, each broker should keep enough state to distinguish if a connection is a normal client connection or a bridge connection. This may be accomplished by techniques well understood in the art. And it should not forward any message that is received over a bridge connection from another broker. Such messages are intended only for distribution to the local subscribers of that broker. This way, it is the sole responsibility of the original broker that receives a published message from its original publisher to send it to all the other brokers.

When the brokers in the cluster are all functioning normally, it is possible that one of the TCP/IP connections between two brokers is broken. Each broker would detect that condition independently when they try to perform their next read or write operation on the connection. When such operations fail, it is the responsibility of the broker that initiated the original connection to retry its attempt to connect to the other brokers in a graceful manner such as using an exponential back-off mechanism with an upper bound. This ensures that there are neither deadlocks nor redundant connections.

During the period where such an inbound bridge connection is broken, it is possible that the sending broker receives a published message that ought to be forwarded to the receiving broker. Since the connection has been lost temporarily, it is the responsibility of the sending broker to persist such pending messages in a local or shared data store so that such messages are not lost. When the connection is eventually re-established, the sending broker would first send all the messages in the store to the remote broker before sending new messages. This permits the ordering of messages can be preserved with reasonable guarantees.

Figure 10:
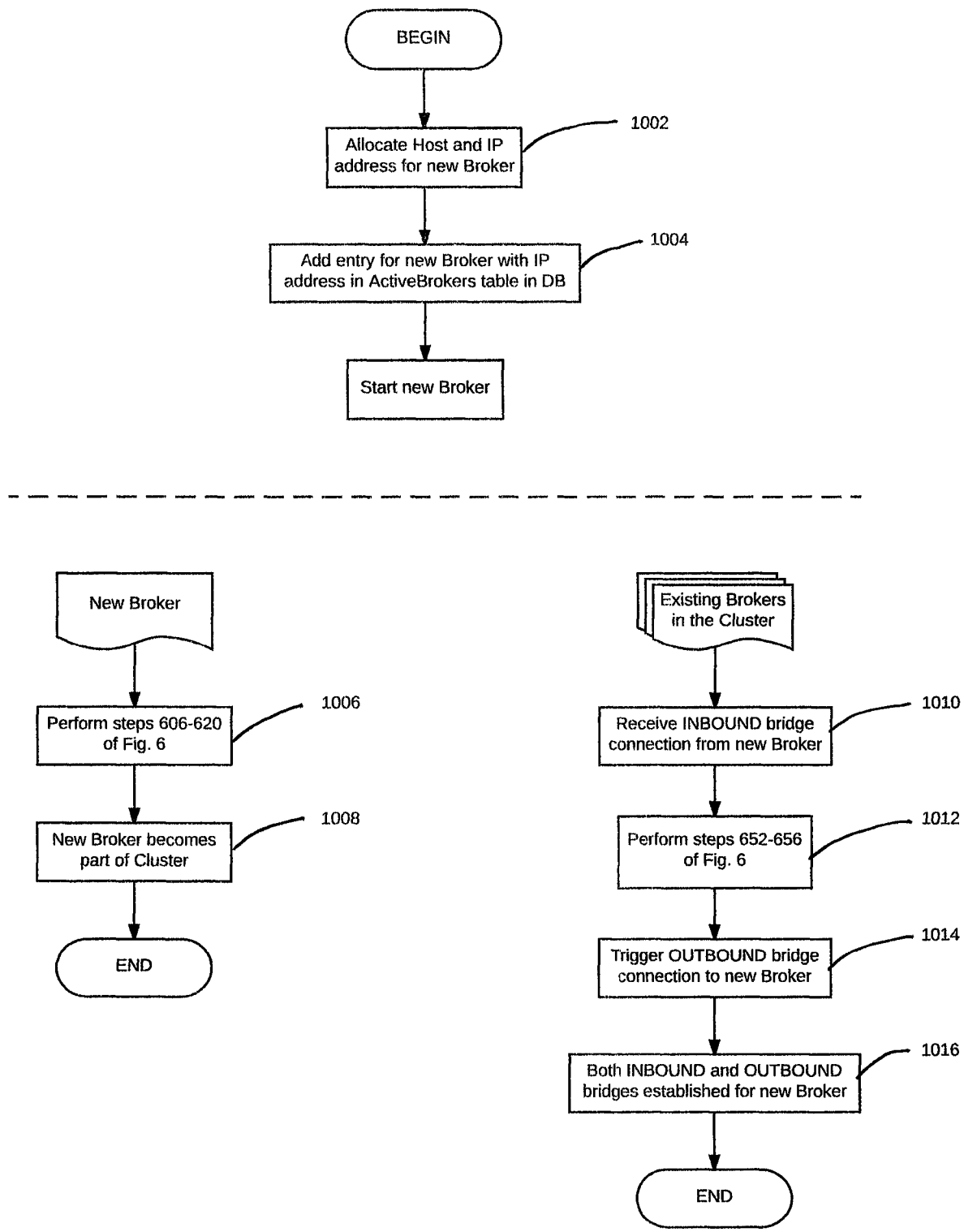
FIG. 10 is a flowchart illustrating steps used to add a broker to a live cluster.

While there are numerous advantages to a system in which all broker-to-broker connections are established before any of the brokers begin accepting messages from external publishers, there may be circumstances in which a new broker will be added to a live cluster where the public ports of all brokers already in the cluster are open and are already serving publishers and subscribers. FIG. 10 is a flowchart that illustrates how a new broker may be brought into a live cluster. In step 1002 the new broker is assigned an ID and an IP address, which are added to the ActiveBrokers table described in FIG. 9 in step 1004. One possible implementation choice for storing the ActiveBrokers table and making it available as a common source of truth for all brokers is a table in a shared database, which is accessible to all brokers. However, there may be other implementations that can provide alternate methods for informing existing brokers of updates to this table.

The subsequent steps involve both a first process that takes place on the new broker and a second process that takes place on the brokers in the pre-existing cluster. As part of the first process, in step 1006 the new broker instance is started up in the same way the existing brokers were started, following steps 606 through 620 as discussed in FIG. 6. Of special importance is the initiation by the new broker of new outbound connections to each of the brokers in the pre-existing cluster, as shown in step 608 in FIG. 6. When these steps have been completed, the new broker is ready to receive publications from publishers and to forward them to the other brokers in the cluster. After completion of this process, in step 1008 the new broker becomes part of the cluster, and can initiate and receive both bridges in communication with other brokers as well as receive messages from publishers and transmit them to subscribers.

In order to connect a new broker to the existing cluster, the brokers in the pre-existing cluster will follow a related process, also as shown in FIG. 10. From the perspective of an existing broker in the cluster, the addition of a new broker will result in an inbound connection request 1010. In a sense, this inbound request initiates the process by which the existing broker becomes aware of the existence of the new broker. This new inbound request will trigger the existing broker to perform step 1012, which consists of repeating steps 652 through 654 in FIG. 6. A key aspect of that process is that the existing broker will need to validate the IP address of the new broker by checking the ActiveBrokers table. Once the new broker has been authenticated, the existing broker accepts the inbound connection. Having established that connection, the existing broker then initiates an outbound connection to the new broker in step 1014, which may consist of performing most of the steps shown in FIG. 6 related to initiating an outbound bridge. However, since existing brokers are already operational and thus have already opened up their public port, the logic to wait for the inbound/outbound connections from/to the new broker doesn't apply.

Once the outbound connection to the new broker and inbound connection from the new broker are both successfully established 1016, the existing broker(s) include the new broker's bridge connection in their fan-out list and start forwarding new published messages from that point onwards.

Until step 1006 happens, existing brokers do not have to worry about storing any pending messages in the persistent data store for new brokers, since the new broker wouldn't accept any connection from clients until all the bridge connections have been established.

Figure 11:
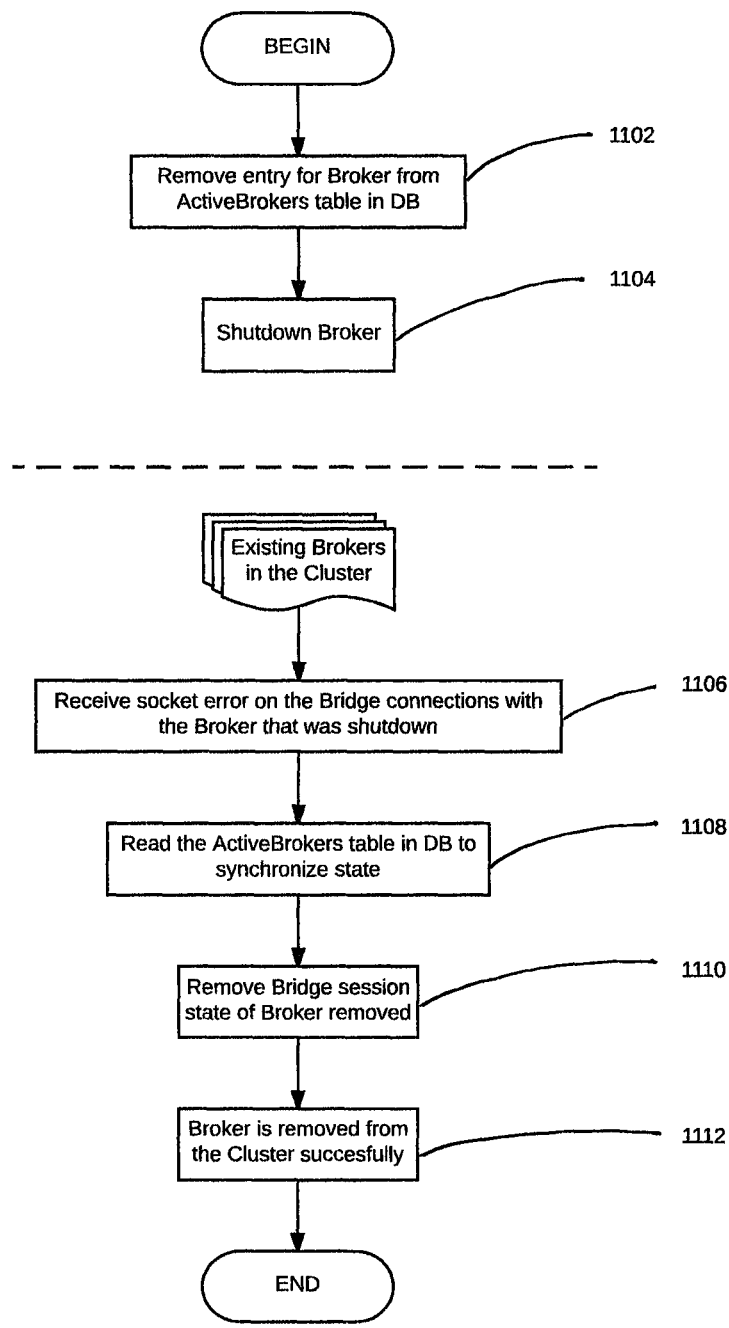
FIG. 11 is a flowchart illustrating steps used to remove a broker from a live cluster.

Another important aspect of the invention is the ability to remove an existing broker from service in an existing cluster in a manner that minimizes interference with the operation of clients and the other brokers. A method for accomplishing this task is illustrated in FIG. 11. In step 1102, the entry for the broker that is to be removed service is deleted from the ActiveBrokers table in the appropriate database. In step 1104 the broker that is to be removed service is shut down by whatever process is deemed appropriate for the orderly shutdown of such a computer.

The second aspect of the removal process is for the other brokers in the cluster to be informed of the removal. The use of the ActiveBrokers table permits the invention to perform this step automatically. At some point after a broker has been removed, each of the other brokers will eventually attempt to send a message to the disconnected broker. In step 1106, the sending broker receives a socket error message informing the sending broker that the removed broker cannot be reached. This result triggers the sending broker to perform step 1108, which is for the sending broker to read the then-current ActiveBrokers table from the master database. The sending broker then updates its local copy of the ActiveBroker table 1110 so that the local copy no longer includes the removed broker. This process is repeated for all of the remaining brokers in the cluster until in step 1112 the removed broker has been deleted from all live copies of the ActiveBroker table, and none of the remaining brokers will attempt to send messages to it.

Figure 12:
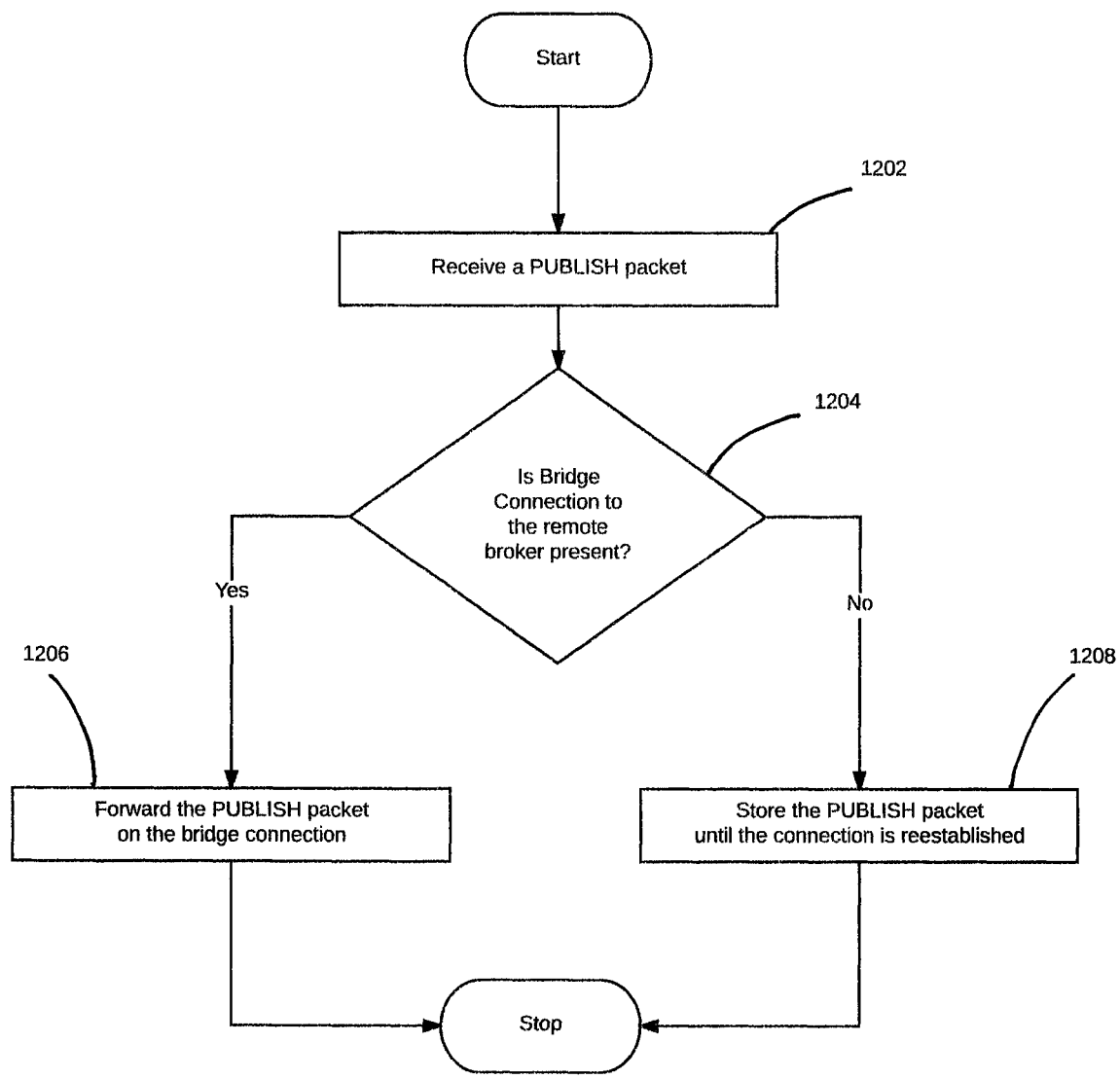
FIG. 12 is a flowchart that illustrates a process that can be used by a broker to recover from problems such as loss of connectivity or hardware failures without failure to transmit data to subscribers.

Another aspect of the invention is the ability to recover from conditions such as an individual broker in a cluster failing, going offline, etc. FIG. 12 is a flowchart that illustrates a process that can be used by a first broker operating as part of the subject invention to recover from such problems without failure to transmit data to subscribers. In step 1202, the first broker receives a PUBLISH packet—that is, a packet of information intended for one or more subscribers known to the broker to be connected to a different broker. In step 1204, the first broker determines whether a bridge connection to that other broker is present. If the appropriate bridge connection is present, then in step 1206 the first broker forwards the PUBLISH packet using the bridge connection. If the first broker determines that the bridge connection is not present, then in step 1208 the first broker stores the PUBLISH packet for later transmission.

Another aspect of this disclosure includes using transport-agnostic processing logic for IoT on both IoT gateways and cloud-connected IoT message brokers to simplify deployment, improve performance, reduce cost and energy use, and improve user experience. The disclosed techniques may be applied generally to a broad range of publish-subscribe IoT messaging protocols and is not limited to a particular implementation. Because the disclosed methods are intended to be agnostic of the transport mechanism between client and the message processor (brokers and gateways), it applies to a wide variety of IoT client transport mechanisms including physical, medium-access control, network and transport layers of protocol stacks.

A large number of messaging protocols have been used to connect IoT devices, both to cloud-based servers or brokers and to local gateways. Those protocols may use different "stacks"—that is different combinations of protocols that are generally thought of as conceptual layers stacked on top of each other. FIG. 13 illustrates three simplified examples of protocol stacks that may be used with the subject invention: a LoRA network, a ZigBee mesh network, and a cellular-based (4G LTE) network. Numerous other protocols exist and could be used with the subject invention, including but not limited to Haystack, a DASH7 Mode 2 development framework for low power wireless networks; NWave, RPMA; Sigfox; and UMB.

FIG. 13*a* represents the protocol stack used in the LoRA system. At the lowest level is the RF layer 1302, which converts the message as processed by all the higher layers to a radio signal for wireless transmission. The next layer is the physical layer 1304. It constitutes the method for transmitting and receiving the raw bits of data as organized in the higher layers. Above the physical layer is the MAC (Media Access Control) layer 1306. The MAC layer provides addressing and channel access control mechanisms that make it possible for several terminals or network nodes to communicate within a multiple access network that incorporates a shared medium, e.g. an Ethernet network. Above the MAC layer is application layer 1308, which is where the data being shared is encoded.

FIG. 13b represents the protocol stack used in communications between devices in a ZigBee mesh network. At the lowest layer is physical layer 1312, which is formatted according the standards in IEEE 802.15.4., and may include the RF layer. Above the physical layer is the MAC layer 1314, which is also formatted according to the specifications of the 802.15.4 protocol. Above the MAC layer is the network (NWK) layer 1316, which manages how messages are transmitted and received using the nodes and channels available in a specific network topology. Above the NWK layer is the Application Support sub-layer (APS) 2018. The APS layer offers interface and control services. It works as a bridge between the network layer and the other elements of the application layer. Finally, above the APS layer is the application layer 1320, which generates and receives the core data being transmitted.

FIG. 13c represents the network architecture for communication between devices using a 4G LTE M2M (machine to machine) topology. Physical layer 1322 carries all information from the MAC transport channels over the 4G cellular network, and thus includes the RF layer. Above the physical layer is MAC layer 1324, which is responsible for mapping between logical channels and transport channels, and operates according to the protocol definition for communications over the 4G cellular network. Above the MAC layer is Radio Link Control (RLC) layer 1326. The RLC layer performs a number of organizational functions, which may include error correction and routing. Above the RLC layer is PDCP layer 1328. The PDCP layer performs functions including compression and decompression and sequencing of messages. Above the PDCP layer are IP layer 1330 and TCP layer 1332, which are widely understood among practitioners in the art. Finally, application layer 1334 carries the core data being exchanged.

Additional aspects of the subject invention include use of tunneling protocols and encapsulation of IoT messages by a protocol-aware load balancer such that the encapsulation is generalized and not limited to Generic Routing Encapsulation (GRE) alone. GRE is a tunneling protocol developed by Cisco Systems that can encapsulate a wide variety of network layer protocols inside virtual point-to-point links over an Internet Protocol network. However, GRE tunneling does not in and of itself make network traffic secure: rather it is a method for allowing one networking protocol to be used to transport (through encapsulation) a second networking protocol. The subject invention combines tunneling with encryption such that provided by the IPSec (Internet Protocol Security) protocol suite. Thus the invention permits a variety of transport protocols to be used and protected even when communications involve geographically dispersed systems communicating over public networks.

Figure 14:
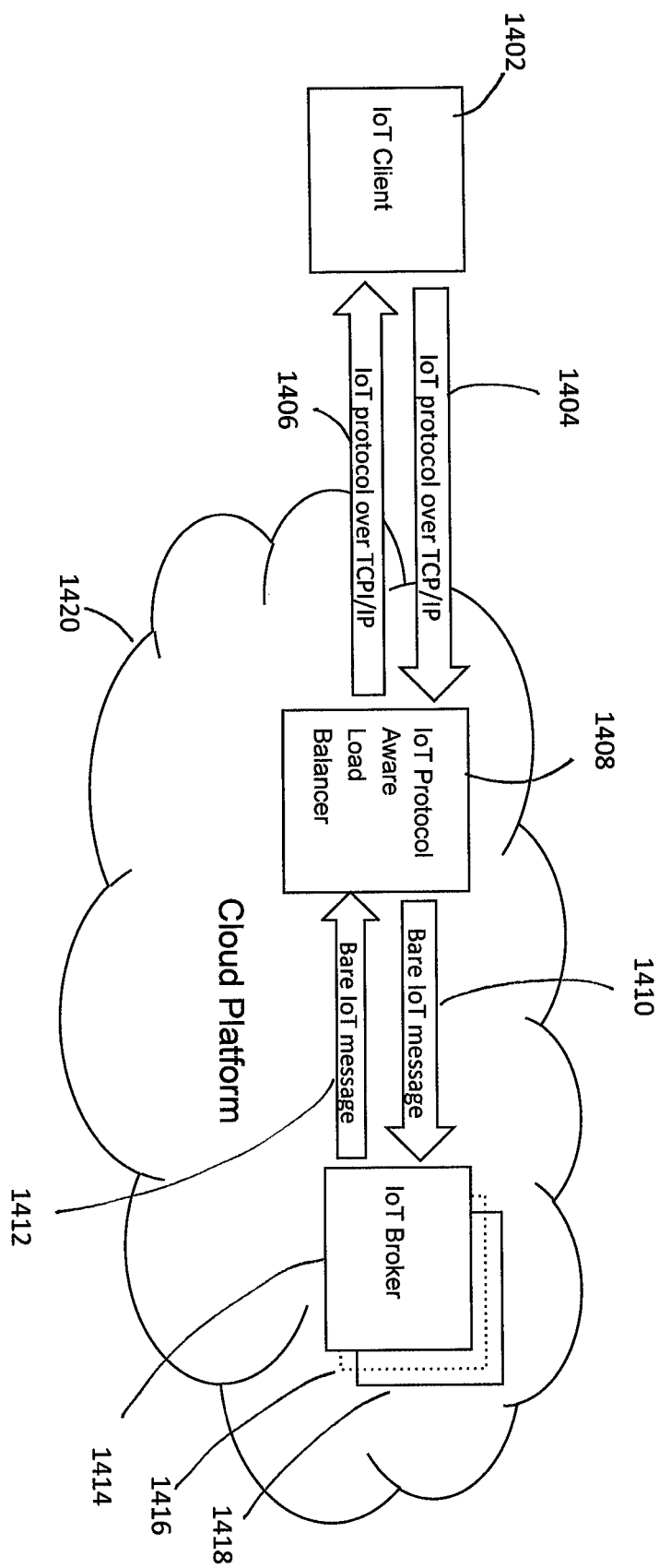
FIG. 14 shows an example of a network architecture that allows a transport-agnostic IoT message processing platform to process such messages in the cloud.

FIG. 14 shows the application of the method described in this disclosure to the scenario of an IoT client communicating to a cloud-resident IoT message-processing broker in the absence of a gateway. IoT clients typically use an IoT publish-subscribe messaging protocol such as Message Queue Telemetry Transport (MQTT) over Transmission Control Protocol/Internet Protocol (TCP/IP), or another IoT protocol such as those discussed in FIG. 13. In order to enhance security, the messages would typically be encrypted using Transport Layer Security (TLS) mechanisms. For example, in a large system with many clients, an IoT client such as a thermostat may (i) encapsulate the sensor data it transmits in an MQTT PUBLISH message, (ii) apply TLS, and (iii) send the message to an MQTT-aware load balancer in the cloud. The MQTT-aware load balancer then (i) terminates the TLS connection; (ii) terminates the TCP connection and (iii) forwards the bare MQTT PUBLISH message using a GRE/IPSec header in front of the MQTT message destined to the MQTT broker in the same cloud provider's network. Thus in FIG. 14, IoT client 1402 sends messages 1404 and receives messages 1406 using any of a wide range of IoT messaging protocols. Those messages are exchanged over a network such as the Internet with load balancer 1408. Load balancer 1408 is capable of parsing and interpreting the IoT protocols being used, as is described in greater detail below. Load balancer 1408 in turn distributes messages 1410 and receives messages 1412 from one or more IoT brokers 1414, 1416 and 1418. Load balancer 1408 and brokers 1414, 1416 and 1418 are located in cloud 1420.

The ability of the system to scale while meeting quality of service obligations is enhanced by the fact that (in the case of the MQTT protocol) the MQTT-aware load balancer uses the device/client Identifier field of the MQTT packet in addition to the QoS level requested by the client and chooses an appropriate MQTT broker in the cloud provider's network and routes the packets to it. As described in more detail below, when the message reaches the appropriate broker, The MQTT broker terminates the GRE/IPSec tunnel, de-capsulates the GRE and IP headers from the packet and provides the bare MQTT message to the MQTT broker stack.

The MQTT PUBLISH is one of the defined messages in that specific IoT protocol flow and is being used as an example to illustrate passing of sensor data from client to broker. However, the method is generally applicable to all of the other MQTT protocol packets, as well as similar messaging techniques in other IoT protocols.

Figure 15:
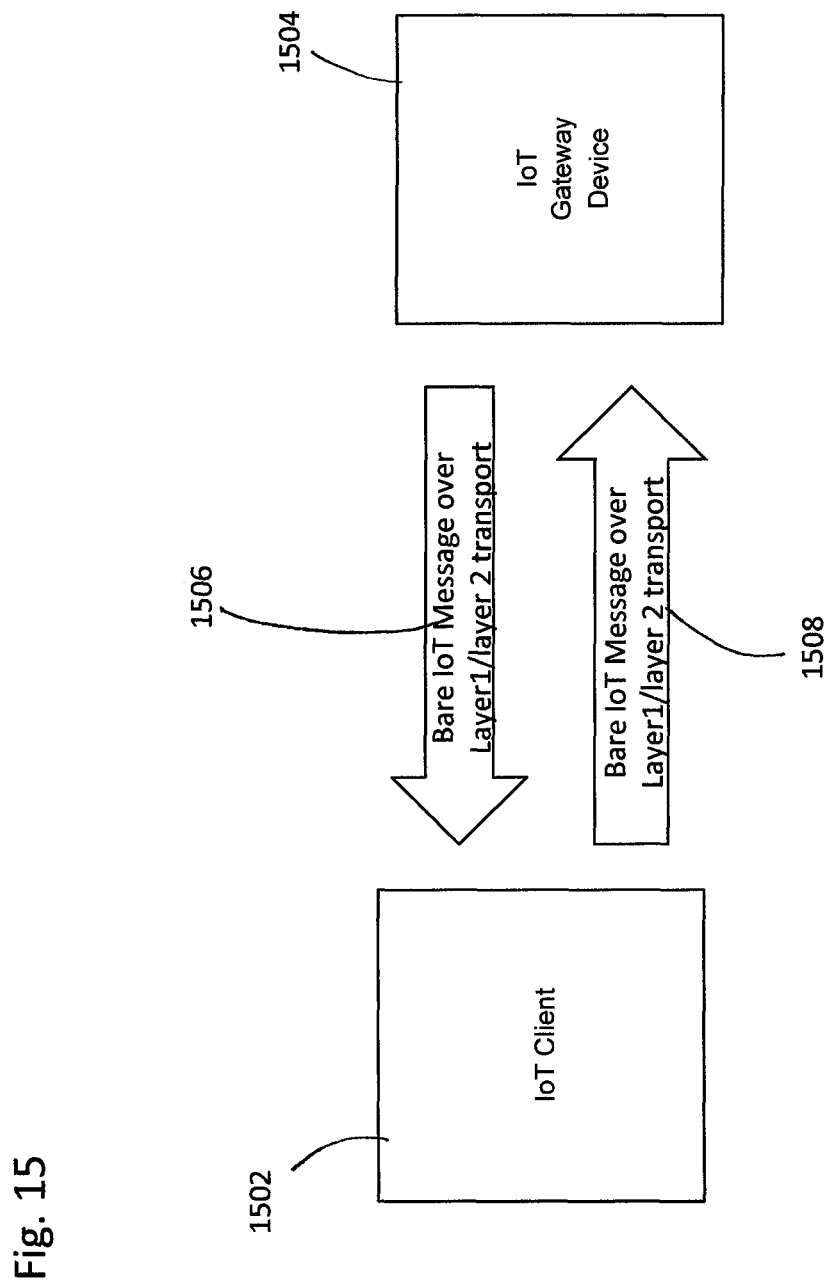
FIG. 15 shows a high-level network architecture that allows for a transport-agnostic IoT message processing platform for directly connected IoT gateway scenario.

FIG. 15 illustrates the flow of messages when an IoT device is directly connected to a local gateway. The local gateway is likely to in turn be connected to a cloud-based server. Those communications will likely follow one of the protocols previously discussed, such as those described in FIG. 13c.

The client IoT device can connected to a local gateway using any one of many available choices of transport, including but not limited to MQTT, networking protocols, Medium Access Control (MAC) layers and Physical Layers, including but not limited to WiFi (802.11), ZigBee, Z-wave, and 6LoWPAN, as described in FIG. 13 above. IoT client device 1502 communicates with local gateway 1504 by sending IoT message 1506, which may contain data such as sensor readings using its choice of transport to IoT gateway 1504, and gateway 1504 may in turn send message 1508 back to IoT client device 1502. Message 1508 may be an acknowledgement of receipt of message 1506, or a request for new data, or may accomplish another purpose.

Figure 16:
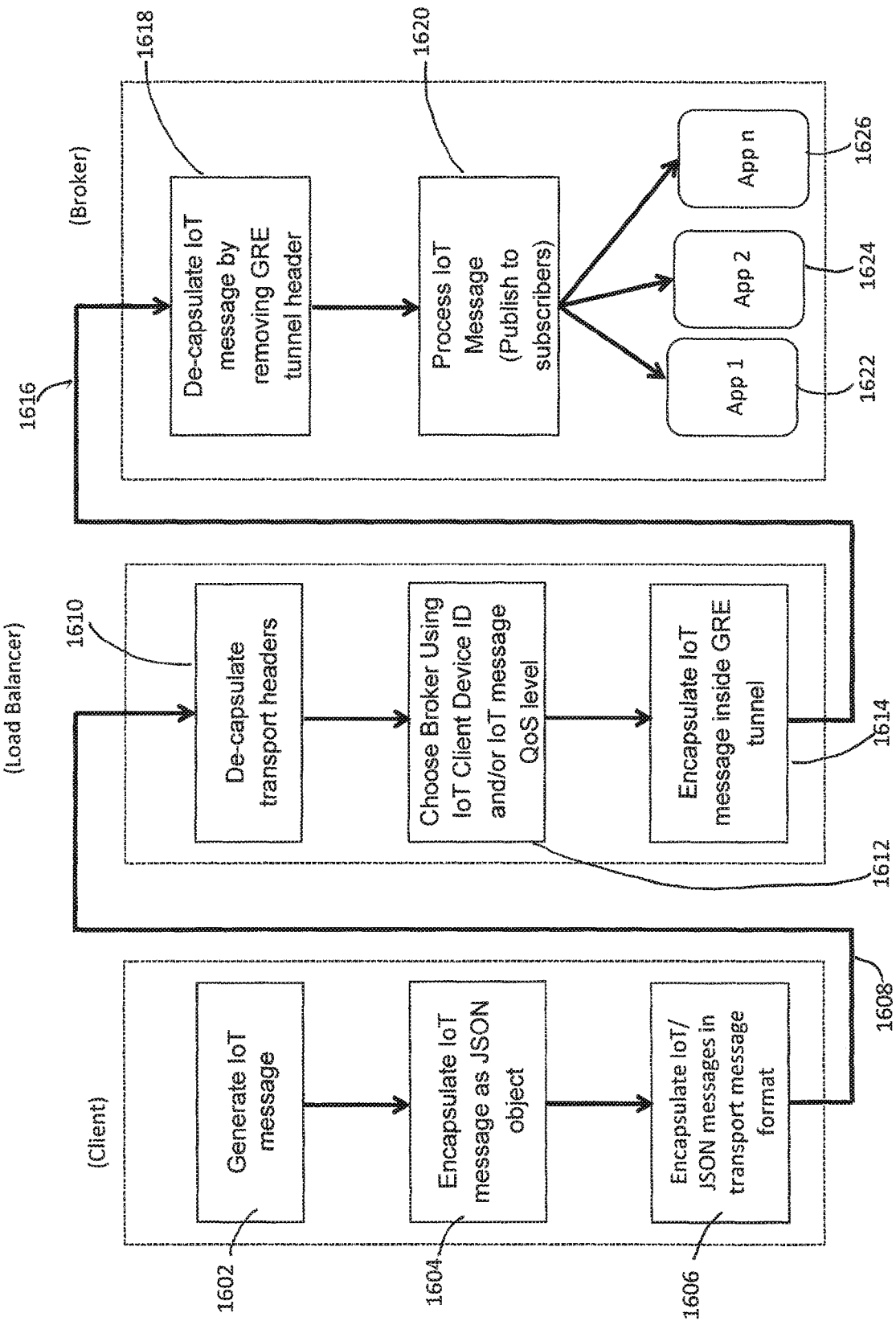
FIG. 16 is a flowchart showing a method for sending IoT messages from an IoT client to a cloud broker using a method described in this disclosure.

FIG. 16 is a flowchart presenting a process sending messages from an IoT client to a cloud broker using the method described in this disclosure. In step 1602, the IoT client generates a message to be sent to the broker. That message may be a sensor reading, a status update, or may contain any other piece of data intended for a broker or another IoT device connected to the same network. In step 1604, the IoT client encapsulate the message in a data interchange format such as JSON, in an application-specific message field of the particular IoT messaging protocol being used, such as MQTT. An MQTT client stack running on the IoT client device may be responsible for encapsulating the JSON message in an MQTT PUBLISH packet, for example.

In step 1606, the MQTT client stack further encapsulates the message (already encapsulated as a JSON message) using a transport-specific method, such as those described earlier. In step 1608, the encapsulated message is sent to the cloud, whether on physical wire or using a wireless network such as a cellular network. In a typical cloud IoT platform scenario, the transport abstraction that is executed at the IoT client will take care of creating a TCP/IP over TLS socket between the client and the protocol-aware load balancer and the IP stack will be responsible for determining the hops for the packet between the IoT client device and the destination servers. Eventually, using Internet Routing mechanisms that are well understood and outside the scope of this invention, the MQTT PUBLISH packet will arrive at the MQTT-aware load balancer. In step 1610, the load balancer will then terminate the TLS connection and the TCP connection, de-capsulate all the headers and hand over the bare MQTT packet to the load balancing process. In step 1612, the load balancing process will use the device/client identifier field of the IoT messaging protocol such as the ClientID field of MQTT protocol packets in addition to secondary fields such as Quality of Service (QoS) levels to determine which load-balanced broker to forward the packet to. This load balancing action will ensure that packets coming from the same ClientID and belonging to the same QoS level will always be processed by the same MQTT/IoT message-processing broker. In step 1614, the load balancer then encapsulates the bare MQTT packet with a GRE header and sends the packet to the chosen MQTT broker within the cloud provider's network. An important benefit of GRE encapsulation is that it solves the problem of intermediate nodes in the message pathway not being aware of the bare MQTT packets that could result in dropping of such packets otherwise.

In order for a node such as a gateway, router or load balancer to appropriately handle a packet that has been sent to it, the packet must be formatted in a manner that is understood by the device. If, for example, an MQTT packet is passed to a load balancer that cannot parse MQTT packets, it will be unable to pass the packet to the appropriate server, and the data will be lost. GRE encapsulation provides a common means for transporting messages based on multiple IoT protocols through the same devices.

In step 1616, the GRE-encapsulated packet is transported from the load balancer to the destination broker. In step 1618, The broker uses a transport abstraction layer to remove the GRE tunnel headers and present the bare message packet to the broker stack. In step 1620, the broker publishes the message to relevant interested parties, including subscribers and other applications 1622, 1624 and 1626 that are interested in the messages generated by the publishing sensor/IoT device.

Figure 17:
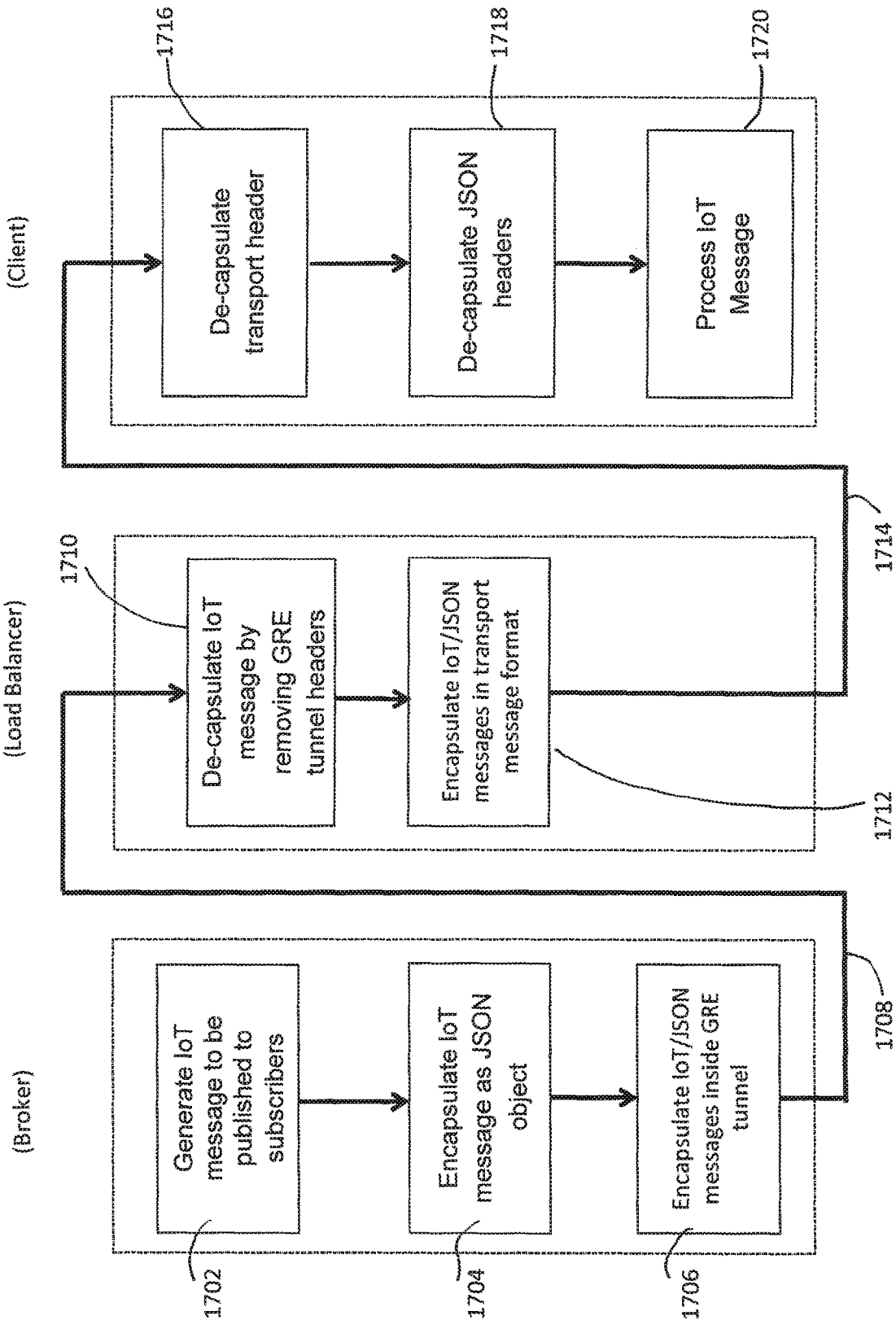
FIG. 17 is a flowchart showing a method for sending IoT messages from a cloud broker to an IoT client using a method described in this disclosure.

FIG. 17 is a flowchart that illustrates the steps involved in publishing a message from a cloud-based broker behind a load balancer to an IoT client. In step 1702 the broker generates a message to be transmitted to one or more clients. The message may originate at the broker, or the broker may be publishing a message it has received from a different IoT client. In step 1704 the broker encapsulates the message in JSON format. In step 1706 the broker further encapsulates the message in a GRE tunnel. In step 1708 the message is sent to the load balancer. In step 1710 the load balancer decapsulates the GRE tunnel header. In step 1712 the load balancer encapsulates the message using a transport-specific method, such as those described earlier. In step 1714 the load balancer transmits the encapsulated message to the client using TCP/IP over TLS. In step 1716 the client IoT device decapsulates the transport header. In step 1718 the client IoT device decapsulates the JSON headers. In step 1720 the client device receives and processes the IoT message.

Figure 18:
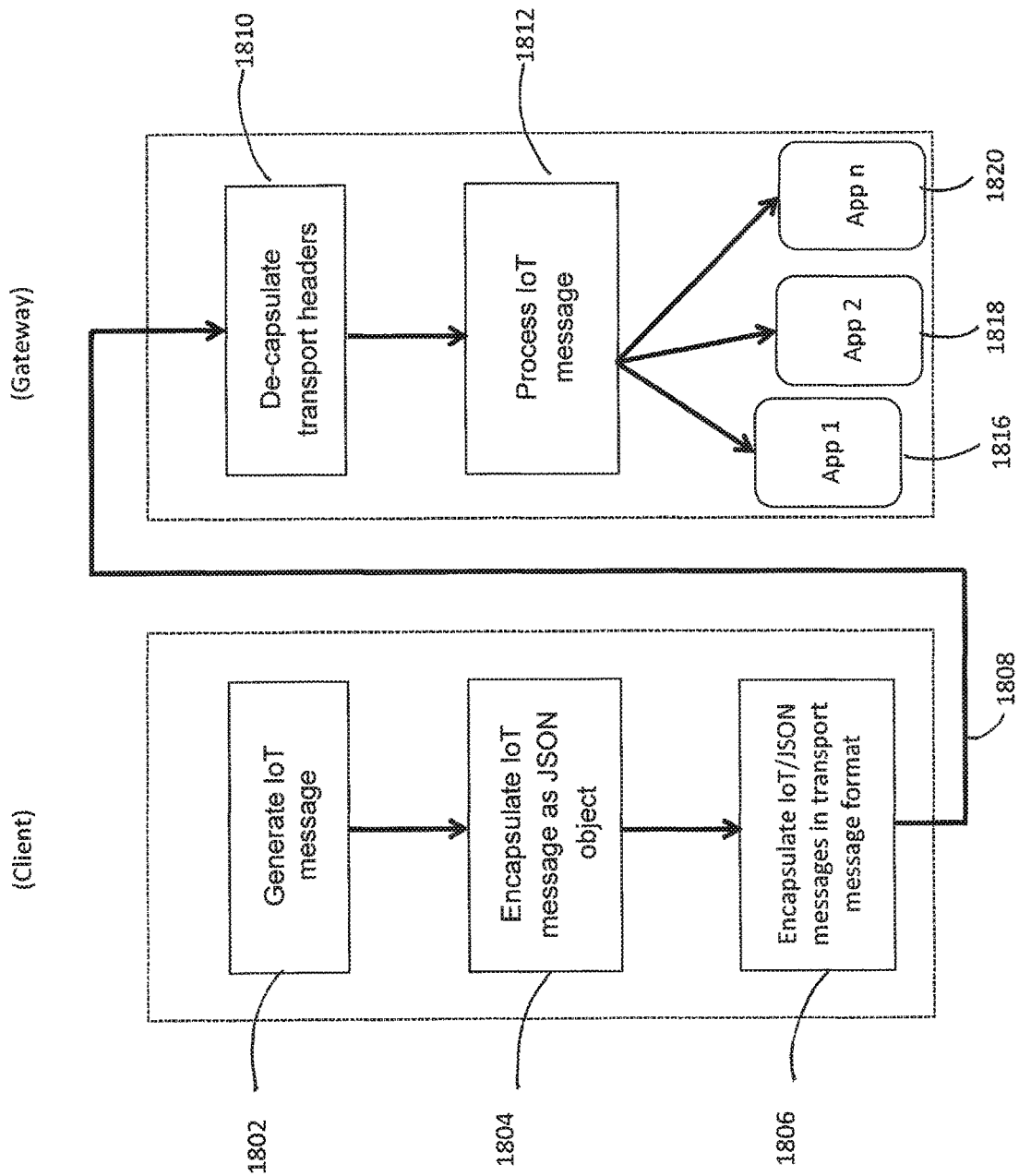
FIG. 18 shows a flowchart for IoT message communication between an IoT client and an embedded edge gateway using a method described in this disclosure.

FIG. 18 is a flowchart that illustrates the steps in a process for IoT message communication between an IoT client and a local gateway functioning as an IoT message broker. In this topology, the local gateway functions as a server in its communications with the IoT client. In step 1802, the IoT client generates an IoT message. If the MQTT protocol is used, an MQTT PUBLISH message will be transmitted to the IoT gateway device; with other protocols, the specific content and formatting of the message may differ. In step 1804 the client encapsulates the sensor reading in JSON format as the message payload in an IoT messaging protocol packet such as the MQTT PUBLISH packet. In step 1806, if the MQTT protocol is used, the MQTT protocol stack then uses a transport abstraction mechanism to send the packet to the embedded edge IoT gateway. A variety of transport abstraction mechanisms can be used, and various security protocols may be included. For example, the IoT client could connect to an edge IoT gateway using LoRa (Long Range Modulation) Physical and Medium Access Control (MAC) layers, as specified in the LoRaWAN specification, V1.0 by LoRa alliance. In this case, the IoT client's MQTT stack would simply use the transport abstraction which would in turn encapsulate the MQTT PUBLISH message payload in a LoRa uplink message, where the MQTT protocol packet is encoded as a confirmed data message, unconfirmed data message or proprietary data message. It is possible that the MQTT packet is combined with MAC commands as part of these LoRa messages. The gateway acts as a LoRaWAN concentrator or base station, and in step 1808 receives the LoRa messages. In step 1810 the gateway de-capsulates the MAC layer header and the MAC commands, if any, present in the payload and then the transport abstraction delivers the bare MQTT message to the MQTT protocol stack. In step 1812, the MQTT protocol stack goes through the list of subscribing destinations and publishes the application sensor reading data to the interested parties and to applications 1814, 1816 and 1818 that might also be interested in the same such as dashboards, business logic processors residing somewhere in the cloud or customer premises.

One of the advantages of this process is that it uses similar processes on both local gateways and on cloud-based brokers. This permits client devices to work with a range of topologies, including both local and WAN-based networks.

While particular embodiments of the present invention have been shown and described, it is apparent that changes and modifications may be made without departing from the invention in its broader aspects, and, therefore, that the invention may be carried out in other ways without departing from the true spirit and scope. These and other equivalents are intended to be covered by the following claims:

What is claimed is:

1. A system for connecting devices into a data network, the system comprising:
    a first device, comprising:
    at least memory comprising instructions;
    at least a processor configured to execute the instructions
        to generate at least a message to be sent from said first device on the network to a second device, wherein said message is encapsulated using the MQTT messaging protocol with at least a first MQTT header to create one or more MQTT messages;
    and said message is further encapsulated in at least a first transport header that may be understood by a second device on the network;

and transmitting said message encapsulated by said transport header from said first device to said second device;

said second device comprising:

at least memory comprising instructions;

at least a processor configured to process the MQTT messages and to decapsulate said message by removing said first MQTT header at said second device, and to execute the instructions to decapsulate said message by removing said first transport header at said second device, and to select one of the plurality of MQTT brokers to forward the decapsulated message by using a combination of a first device identifier, an MQTT topic, and at least a Quality of Service, in order to achieve an efficient distribution with low latency;

encapsulate said message at said second device in at least a second header that may be understood by a third device on the network;

and transmit said message from said second device to at least one of a plurality of said third devices, where said at least a processor on said second device is also configured to determine a load on each of said plurality of third devices and routing said message to one of said plurality of third devices based at least in part on said determination by said second device of relative loads on said plurality of third devices; and the plurality of third devices comprising:

at least memory comprising instructions;

at least a processor configured to execute the instructions to decapsulate said message on said third device by removing said second header;

wherein said second device and said plurality of third devices are at a separate physical location from said first device;

wherein said third devices comprise a plurality of message brokers within a server cluster;

wherein said second device is connected with a plurality of said third devices; and wherein said second device is aware of at least a messaging protocol used to communicate between said first device and said third device.

2. The system of claim 1 where said second device maintains different MQTT brokers to select from depending on a Quality of Service level in the said MQTT messages to enable low latency for higher Quality of Service levels and higher latency for lower Quality of Service levels.

3. The system of claim 1 where said first device encapsulates said message inside a GRE tunnel.

4. The system of claim 1 where said second device is capable of interpreting messages based on multiple transport protocols.

5. The system of claim 1 where said third device is capable of interpreting messages based on multiple transport protocols.

6. The system of claim 1 where said third device decapsulates JSON headers.

7. The system of claim 1 where said first device generates messages using the MQTT protocol.

8. The system of claim 1 where at least some communications between said first device and said second device take place using a cellular network.

9. The system of claim 1 where at least some communications between said first device and said second device take place using a wireless radio network.

10. The system of claim 1 where said second device is a load balancer.

11. A method for connecting devices into a data network, the method comprising:

generating at least a message to be sent from a first device on the network;

encapsulating said message using the MQTT messaging protocol with at least a first MQTT header to create one or more MQTT messages;

further encapsulating said message in at least a first transport header that may be understood by a second device on the network;

transmitting said message encapsulated in said transport header from said first device to said second device;

decapsulating said message by removing said first header at said second device;

encapsulating said message at said second device in at least a second header that may be understood by a third device on the network;

transmitting said message from said second device to at least one of a plurality of said third devices;

determining a load on each of said plurality of third devices;

routing said message to one of said plurality of third devices based at least in part on said determination by said second device of relative loads on said plurality of third devices; and decapsulating said message on said third device by removing said second header;

configuring at least a processor to process MQTT messages and to decapsulate said message by removing said first MQTT header at said second device, and to execute the instructions to decapsulate said message by removing said first transport header at said second device, and to select one of the plurality of MQTT brokers to forward the decapsulated message by using a combination of the said first device identifier, an MQTT topic, and at least a Quality of Service, in order to achieve an efficient distribution with low latency;

wherein said second device and said plurality of third devices are at a separate physical location from said first device;

wherein said third devices comprise a plurality of message brokers within a server cluster;

wherein said second device is connected with a plurality of said third devices; and wherein said second device is aware of at least a messaging protocol used to communicate between said first device and said third device.

12. The method of claim 11 where said second device maintains different MQTT brokers to select from depending on a Quality of Service level in the said MQTT messages to enable low latency for higher Quality of Service levels and higher latency for lower Quality of Service levels.

13. The method of claim 11 where said message is encapsulated by said first device inside a GRE tunnel.

14. The method of claim 11 where said second device is capable of interpreting messages based on multiple transport protocols.

15. The method of claim 11 where said third device is capable of interpreting messages based on multiple transport protocols.

16. The method of claim 11 where said third device decapsulates JSON headers.

17. The method of claim 11 where said first device generates messages using the MQTT protocol.

18. The method of claim 11 where at least some communications between said first device and said second device take place using a cellular network.

19. The method of claim 11 where at least some communications between said first device and said second device take place using a wireless radio network.

20. The method of claim 11 where said second device is a load balancer.

* * * * *